(12) United States Patent
Hallett et al.

(10) Patent No.: US 9,590,950 B2
(45) Date of Patent: Mar. 7, 2017

(54) SOURCE BASED ANONYMITY AND SEGMENTATION FOR VISITORS

(71) Applicants: James Francis Hallett, Vancouver (CA); Daryl Dean Harms, Calgary (CA); Kirk Arnold Moir, New Westmister (CA)

(72) Inventors: James Francis Hallett, Vancouver (CA); Daryl Dean Harms, Calgary (CA); Kirk Arnold Moir, New Westmister (CA)

(73) Assignee: LOCALITY SYSTEMS INC., New Westminster (CA)

(*) Notice: Subject to any disclaimer, the term of this patent is extended or adjusted under 35 U.S.C. 154(b) by 13 days.

(21) Appl. No.: 14/690,347

(22) Filed: Apr. 17, 2015

(65) Prior Publication Data

US 2015/0304283 A1    Oct. 22, 2015

Related U.S. Application Data

(60) Provisional application No. 61/981,587, filed on Apr. 18, 2014.

(51) Int. Cl.

| | | |
|---|---|---|
| *G06F 21/00* | (2013.01) | |
| *H04L 29/06* | (2006.01) | |
| *G06F 21/62* | (2013.01) | |
| *H04L 29/12* | (2006.01) | |

(52) U.S. Cl.
CPC ...... *H04L 63/0421* (2013.01); *G06F 21/6254* (2013.01); *H04L 61/6022* (2013.01)

(58) Field of Classification Search
CPC .. G06F 21/60; G06F 21/6245; G06F 21/6254; G06F 21/62; G06F 21/6209; G06F 21/6218
See application file for complete search history.

(56) References Cited

U.S. PATENT DOCUMENTS

2009/0118002 A1* 5/2009 Lyons ..................... G07F 17/32
463/29
2012/0303616 A1* 11/2012 Abuelsaad .......... G06F 21/6227
707/736
2013/0297422 A1* 11/2013 Hunter ............... G06Q 30/0261
705/14.58

(Continued)

OTHER PUBLICATIONS

Cisco Systems—Meraki;Apr. 2014; White Paper CMX Analytics.

(Continued)

*Primary Examiner* — Edward Zee

(57) ABSTRACT

A method and system for the anonymization and segmentation of the media access control (MAC) addresses reported by visitors' 802.11 enabled devices at a venue operator premises. This system assures a venue operator and its visitors that no individually identifying information about a visitor is re-transmitted or stored that can be traced back to their MAC address, while still allowing the venue operator to obtain venue visitor counts visit frequencies well as traffic patterns during visits (i.e. dwell times at, and movements between, locations within a venue) and counts of common visitors between venues. It also ensures that the data generated is segmented so that the data obtained by two different venue operators is not correlatable between visitors common to the two sets of data.

18 Claims, 18 Drawing Sheets

(56) References Cited

U.S. PATENT DOCUMENTS

2015/0045053 A1* 2/2015 Barneson ............ H04W 64/00
455/456.1

OTHER PUBLICATIONS

Huawfi; 2013; The Second Phase of LTE-Advanced.
Ericsson; Jan. 2013; White Paper LTE Release 12.
Qualcomm; Jul. 2014; Creating a Digital 6th Sense With LTE Direct.
Qualcomm; Feb. 18, 2013; LTE Direct the Case for Device-to Device Proximate Discovery.
Institute for Information Industry, 2012, Proximity Communication.
Wikipedia—accessed Feb. 22, 2016; Facial Recognition System.

* cited by examiner

11A - combined SH

11B - SH functions split into SCH and SOH

13A - combined SH (Operator/CC Determined Location)

13B - combined SH (PR Determined Location)

SOURCE BASED ANONYMITY AND SEGMENTATION FOR VISITORS

CROSS-REFERENCES TO RELATED APPLICATIONS

This application claims priority from Provisional U.S. patent application Ser. No. 61/981,587, filed Apr. 18, 2014, the disclosure of which is incorporated herein in its entirety by reference for all purposes.

BACKGROUND OF INVENTION

1. Field of Invention

The present invention relates to systems and methods of proximity recognition systems (PRS's), wherein a visitor's presence and location within a venue are monitored and received by one or more sensor devices located at known locations.

2. Description of Related Art

This invention uses a similar method and procedure for proximity detection and recognition of WLAN and related enabled mobile devices as described in pending U.S. application Ser. No. 14/104,417 (Title: "Method and System for Wireless local area network Proximity Recognition"), which, in its entirety, is incorporated herein by reference.

A growing percentage of people carry an 802.11 enabled device (i.e. smart phone or tablet) while visiting venues (i.e. malls, retail stores). If turned on, these will usually be periodically broadcasting data packets (i.e. probing for available access points or communicating with a public access point they are currently connected to).

Every 802.11 enabled device has a media access control (MAC) address which is sent as part of each packet it broadcasts. In normal operation, this MAC address uniquely differentiates it from all other 802.11 enabled devices. The address consists of six bytes. The first three bytes identify the device supplier (e.g. Apple or Samsung) and the final three bytes uniquely identify the device within the supplier group.

802.11 wireless local area networks use high frequency radio technology. An 802.11 enabled computer or sensor device is generally designed with a wireless network interface controller (WNIC) which is its interface to its radio transceiver. It has become standard for this WNIC to have the capability of being put in monitor (RFMON) mode. In this mode, all packets (or "Protocol data units" or PDUs under 802.11 protocol) seen by the wireless radio transceiver the WNIC interfaces to, can be obtained and analyzed by an application program. Each packet or PDU has the MAC address of the source device that generated and broadcast it. Upon reception, the PDU is augmented with the time of reception and the signal strength it was recorded to have been received with. The latest versions of Mac OS X, Microsoft Windows and Linux support this functionality. Also Linux variants such as OpenWrt and DD-WRT that are targeted to run on a wide variety of routers support this functionality. Examples of operating environments mentioned herein are non-limiting of the principles of the present invention which can be implemented otherwise.

These augmented packets (with their source MAC addresses, received signal strengths and reception time) are available to applications running on these receiving devices. A single receiving device can thus detect presence (based on source MAC address) and determine proximity (based on signal strength). The readings from a group of two or more such devices at known fixed positions in a venue can be used to detect the changes in locations (paths traversed) within the venue, of the people carrying the transmitting devices as they move within the venue (by recording relative signal strengths for given source MAC addresses). By combining this data over time, such statistics of frequencies of visits to a venue, traffic patterns within a venue and number of common visitors between venues, can be obtained.

A Proximity Recognition System (PRS) includes one or more Proximity Recognition Devices (PRDs) with a Central Station or Central Controller (CC). The Central Controller receives and analyzes the readings from the PRDs and is used by the operator of the PRDs/PRS to generate reports. The physical locations of each PRD may be known (or knowable) by the Central Controller.

The original standard Unix user authentication mechanism had a user enter a password (i.e. a string of characters that they would be able to remember and re-enter whenever they desired to log in to the system). The system would hash this password (run it through a function that generated a fixed length "fingerprint" that could not be used to obtain the original password—that is, a one-way function that could not be reversed). Only this hashed fingerprint (not the original password) was ever stored (e.g. in the /etc/passwd or /etc/shadow files in the Unixx environment). When the user re-entered their password on a subsequent log in (authentication procedure) the same function would be applied to it and the result compared to the stored hashed fingerprint. A match raised the inference that they had re-entered the original password and the authentication was considered to be successful.

This basic password authentication mechanism has been attacked by running a group of likely password candidates (i.e. common names) through the hash function used and comparing against the actual hashed values for the passwords (e.g. in the /etc/passwd or /etc/shadow files in the Unix environment). For any matches found, the attacker will have determined the original password. This is often referred to as a "look-up table" attack (where the look-up table contains the likely password candidates each with the value they hash to).

A technique in common usage to protect against a "look-up table" attack is to "salt" the passwords. When a new or changed password is entered by the user, a random string is generated (its "salt") and combined with the password. This combined string is then hashed. This hashed value and its salt are stored together in the password table (e.g. in the /etc/passwd or /etc/shadow files in the Unix environment).

This "salting" technique is now commonly used for passwords to access certain functionality in websites. Website visitors are asked to create such passwords But they will often use weak passwords and use the same password for more than one if not all of their sites. Websites may have thousands to millions of users. The salting protects against a site's password database against breach and the "look-up table" attack being used to obtain a large number of passwords that could then be used to attack other sites.

Web sites and companies deploying internal networks of computers (i.e. those running Microsoft Windows or Linux) can also set up and enforce password policies where they force levels of complexity (i.e. minimum length and minimum number of lower, upper, numeric and/or punctuation characters) and age limits (i.e. number of days) on all the passwords.

SUMMARY OF THE INVENTION

This invention applies a variant of the technique of the hashing of salted passwords to anonymize and segment the MAC addresses seen by instances of Proximity Recognition Systems (PRSs).

One objective of the present invention is to provide secured source based anonymity for the MAC addresses of visitors to sites monitored by these PRS's. This allows the venue operator to guarantee to visitors that no information is re-transmitted from or stored in the PRS that can be traced back to them, i.e. the visitors and their individual MAC address (i.e. their personal device). But at the same time still allows the venue operator to obtain anonymized statistics of visitor behavior. These statistics may include overall counts and the visit frequencies of their visitors, traffic patterns during visits (i.e. dwell times at, and movements between, different locations within the venue) and counts of common visitors between venues (when an instance of a PRS spans multiple venues).

Another objective is to ensure that the correlation of visitor behavior can be limited via source based segmentation. According to the present invention, a Visitor Correlation Group (VCG) is a group of PRDs that the operator desires to correlate visitor proximity behavior therebetween. In one scenario, where the venue is a store, the operator is the merchant who might define a VCG correlating visitor traffic patterns within and between physically distinct retail-based department within the store (e.g. confectionery department, fresh foods department, clothing department). In other scenario, where the venue is a multi-site like a shopping mall, the operator is the mall owner who might define a plurality of VCGs, each VCG for relating stores and common areas within the mall, to facilitate correlating traffic patterns between stores, store entrances, mall entrances and common mall areas (such as food courts). In another scenario, there is a single owner/operator of a plurality of malls, with each mall having a VCG defined therefor. This invention ensures that no correlation is possible of visitor behavior between different VCGs (i.e. no ability to even know of the occurrence of a common visitors between them). Each instance of the PRS will be its own VCG. Also, even within an instance, it is possible to define separate VCGs to eliminate unnecessary visit correlations.

In accordance with the present invention, there is provided a system where a unique "group" or salt is generated and maintained for each Visitor Correlation Group (VCG). This salt is obtained by each PRD in the VCG and combined with the MAC address from each PDU it receives from any device. This combined string is then cryptographically hashed to generate an anonymized identifier (or "Visitor Identifier", as explained below) for the reading recorded from this PDU. Thus all readings from the same originating device for all PRDs within the VCG will be mapped to the same anonymized identifier at source (i.e. at the PRD).

However, if a PRD in another VCG sees the MAC address of a device seen by a PRD in the first VCG, the anonymized identifier it creates for the readings it records will be different and there will be no correlation possible between them. Thus, the readings are segmented by the VCG boundary.

This "group" salt or VCG salt can also be configured to expire after time limit, such that at a given time, the then active salt is replaced by a new one by all PRDs in the VCG. The readings seen and recorded for a common device before and after this time will be different and there will be no correlation possible between them. Thus the reading within a VCG can be further segmented into time intervals.

There are differences in the requirements and environment between a password authentication systems and the anonymization of MAC address of this invention. One first important difference is that in a password authentication system, the user creates their own password as a required step before it ever needs to be dealt with for authentication. But here, a new (i.e. not seen before) MAC address can arrive at any time (and possibly to more than one PRD at the same time). The first part of this is passwords are created by the users and the password authentication system can enforce a level of complexity on them and force them to be periodically reset. Conversely, MAC addresses are preset on devices and will very rarely be changed (i.e. one needs to root the Android/Apple IOS devices to modify them). They last as long as the device is kept and the majority of people will keep the same device (and thus same MAC address) for several years (e.g. the length of a cell phone contract). A second difference is the arrival of new MAC addresses without an initial registration step. This, along with the possibility of their arrival to multiple PRDs at the same, would complicate creating an individual salt for each one. This invention creates a different group salt for each VCG rather than individual salts for each MAC address.

In password authentication systems, the salts are kept in a central table with the hashes generated using them. However, each of the present invention's salts is for a whole group (i.e. a whole VCG). Since these salts are used to segment the data for private use within the boundaries of a single VCG, they are secured and are kept separate as each is only needed by its own VCG. An aspect of the present invention is to use an individual Salt Handler (SH) for each VCG. An SH generates, maintains and disseminates the salt to the PRDs in its VCG.

Different operators of different PRS instances may want to segment their systems into multiple VCGs and may have different requirements for who has authority over the configuration options for them. The Central Controller (CC) (which is the operator's interface to configure and obtain visitor information on their PRS instance) may be a cloud-based server shared by many operators of many PRS instances.

An aspect of the invention is that the SHs can be configured to start and run in different places within the system for each VCG. They could run on the CC or on one of the PRDs in the VCG or on a different server connected to the network.

In the basic embodiment of this invention, the CC will determine the location for and start the SH for each VCG that has been configured. The SHs will connect to the CC to obtain any necessary configuration information and for the information for authenticating the PRDs in the VCG. Each SH will independently generate the salt to be used in its VCG along with its expiry date. The Proximity Recognition (PR) processes running on the PRDs will first connect to the CC to obtain the network address of their SH and authentication information for connecting to their SH. Then they will connect to the SH to obtain the active salt for the VCG and its expiry date.

Before the current salt expires, the SH will generate the next salt and all the PRs in the VCG will connect to SH to obtain the next salt. All the PR processes in the VCG will then switch to using the next salt at the same time.

To provide further isolation between the VCG salts and the central controller (CC), in an alternative embodiment of this invention, the functionality of the Salt Handler process can be split into two separate processes. These are Salt Configuration Handler (SCH) process and Salt Operations Handler (SOH) process. In this embodiment the SCH process for each VCG is started by the CC. Each SCH process in turn starts its corresponding SOH process. The SCH process connects to the CC to obtain any necessary configuration information and passes this in turn to its SOH (when its SOH connects to the SCH and requests it). The SOH process takes on the function of generating the salts to be used in its VCG. This embodiment provides a buffer between the SOH process (where the salt for a VCG is generated and stored) and the CC. There is no interaction or communication directly between the CC and the SOH processes. In this embodiment, the PR processes are required to perform an extra step in obtaining the VCG salt. They first connect to the CC to obtain the network address and authentication information to connect to their SCH process. They next connect to their SCH process to obtain the network address and authentication information to connect to their SOH process. They can then connect to their SOH to obtain the current salt (and when it is time to, the next salt) for the VCG.

Also to provide isolation between the VCG salts and the central controller (CC), another embodiment of this invention is for the PRs to arbitrate (or employ some other method to choose) among themselves to determine where to locate and start their SH. In this embodiment the PRDs (PRs) will each connect to the CC to obtain the VCG configuration information, network addresses of, and authentication information to communicate with, the other PRDs (PRs) in the VCG. They then choose which of their PRD locations to start the SH on. Then the PR on the chosen PRD starts its SH.

DETAILED DESCRIPTION OF THE INVENTION

The present invention is described in detail with regard to the drawings.

Figure 1:
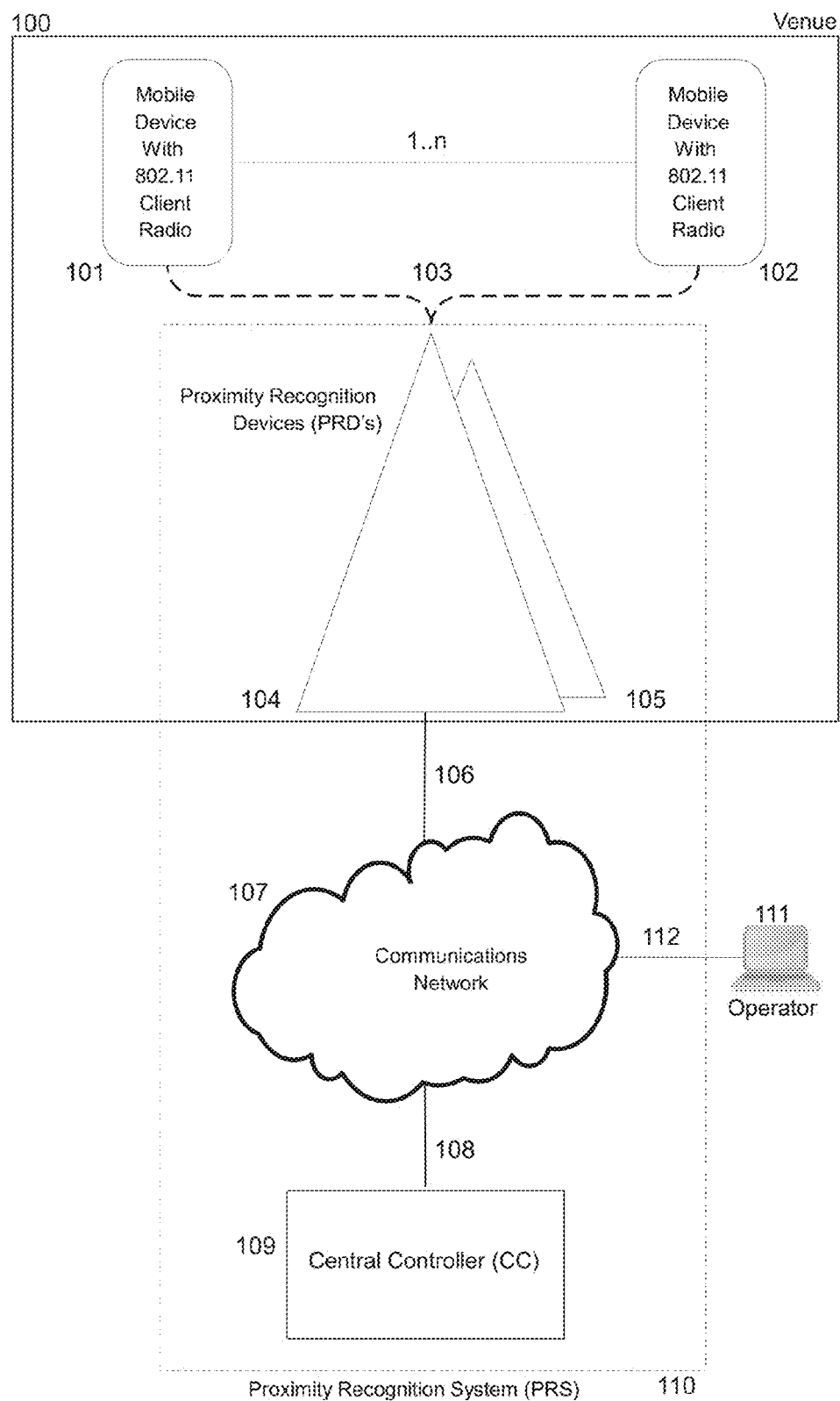
FIG. 1 is a functional block diagram of a proximity recognition system (PRS)

Referring to FIG. 1, the principal components to implement the present invention are illustrated in a block diagram. A system and method is provided for proximity detection, recognition and classification of wireless local area network (WLAN) enabled devices without a WLAN infrastructure. The proximity recognition system (PRS) monitors WLAN communications at one or more known locations depicted in FIG. 1 as 100. The proximity of Wi-Fi enabled mobile device 101 or plurality of devices 101, 102, 103 (herein, Wi-Fi Device(s)) is sensed by examining signal strength at proximity recognition device (PRD) 104, 105 when the Wi-Fi device 101 initiates an association request for WLAN access. An identifier of the Wi-Fi e device may be provided in the association request. Association requests may be periodic or may be prompted by a specific response from the WLAN PRD 104 which may operate on one or more WLAN channels. Association requests may be sensed by one or a plurality of PRDs 104, 105. Information received by the PRDs is analyzed, summarized and sent via communications interface 106 comprising a combination of cable modems, DSL, DS1, DS3, SONET, Ethernet, fiber optic, WiMax, WiFi 802.11 or other wireless technology such as CDMA, GSM or long term evolution (LTE) or other future communications capability to a communications network 107 such as the Internet. Central Controller 109 of the Proximity Recognition System (PRS) 110 is connected to the same communications network 107 via communications interface 108. Venue Operator 111 is also connected to network 107 via communications link 112. Operator 111 may query Central Controller 109 to obtain the information available on current or past visitor counts, their movements and frequencies.

Figure 2:
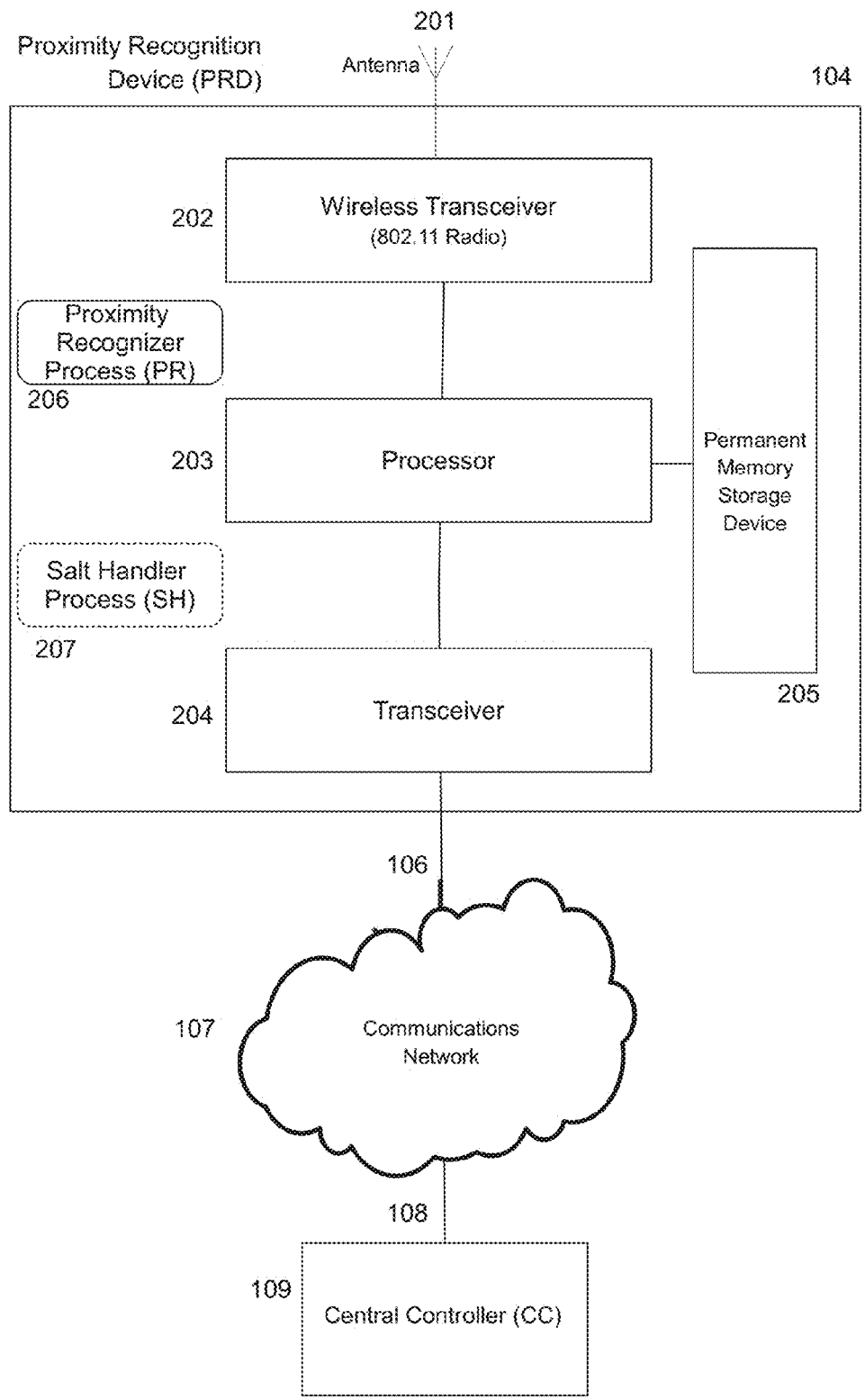
FIG. 2 is a functional block diagram of a proximity recognition device (PRD).

FIG. 2 presents a block diagram of a proximity recognition device PRD 104.

PRD 104 is equipped with WLAN capable transceiver 202 and antenna 201 for sending and receiving packets to and from Wi-Fi devices in the vicinity of PRD 104.

PRD 104 is equipped with transceiver 204 for sending and receiving information to/from Central Controller 109. A wide variety of implementation are possible. These include Ethernet, a separate WLAN radio, universal serial bus, or other wireless wide area wireless networking device such as technology such as CDMA, GSM or long term evolution (LTE). Transceiver 204 connects to communications network 107 such as the Internet over wired or wireless communications interface 106.

PRD 104 is equipped with permanent memory storage device 205 for storage of program instructions related to the operation of the proximity recognition system PRS (including itself). In various implementations, this could include compact flash or similar memory devices.

PRD 104 processor 203 is configured to execute instructions stored in permanent memory storage device 205. These instructions will be executed as processes such as Proximity Recognizer (PR) Process 206 (herein, for economy of expression, sometimes "PR process 206" or simply "PR"); and Salt Handler (SH) Process 207 (herein, for economy of expression, sometimes "SH process 207" or simply "SH"), both explained below. PRD 104 continuously runs its PR process 206; and that PRD 104 is programmed to run its SH process 207 (and thereby perform the role of Salt Handler for its VCG (i.e. the entity that generates, maintains and disseminates the salt to the other PRDs in its VCG), but will only do so if and when that PRD 104 is determined to be the Salt Handler for its VCG (sometimes below expressed as "locating" the SH in a PRD. Accordingly, FIG. 2 shows PR 206 in solid lines and SH 207 in dotted lines, for the embodiment where the SH process is to be located and run in a PRD.

PRD 104 runs the PR Process 206 to provide detection and recognition of Wi-Fi devices in range of PRD 104 without a WLAN infrastructure. The ability to provide this capability is important in venues that do not (for its business reasons) control WLAN infrastructure or do not wish to provide WLAN access for visitors.

PRD 104 monitors WLAN communications at its known location within the venue, obtaining identifiers and inferring the location of a Wi-Fi device from the packets it sees from the Wi-Fi device's attempts to associate with a WLAN access point.

PRD 104 may optionally monitor multiple WLAN communications channels at its known location in the venue.

Based on a dynamically determined understanding of the WLAN infrastructure environment and WLAN infrastructure of interest to the Wi-Fi device, PRD 104 may prompt an association request from the Wi-Fi device by sending to the Wi-Fi device a specifically formatted response. To improve the Wi-Fi device location inference, more interactions may be prompted by PRD 104. The prompted association request is preceded by management frames in the scanning and authentication phases of the association sequence.

Specifically, PRD 104 provides for detection of a WLAN association request received via the antenna component 201 and wireless transceiver 202, wherein the association request is associated with a request from an originating Wi-Fi device to gain access to a wireless local area network.

The association requests and management frames of the association sequence will be sent by the Wi-Fi devices and received by PRD 104 in the form of 802.11 PDUs.

The presence of a Wi-Fi device is detected by the reception of a PDU from it. The Wi-Fi device's proximity to PRD 104 can be sensed by examining the signal strength of PDU received.

As defined in the 802.11 protocol standards, each PDU will contain a unique identifier of the Wi-Fi device that sent it, in the form of a six byte media access control (MAC) address. With these MAC addresses, PRD 104 can differentiate the PDUs it receives from different Wi-Fi devices and correlate PDUs received from the same Wi-Fi device.

In one embodiment, PRD 104 may generate a corresponding Proximity Event to forward to Central Controller 209 for further processing for each PDU it receives. A Proximity Event may include the time stamp of when the PDU was received, a proximity indicator and a Visitor Identifier for the Wi-Fi device that transmitted the PDU. The proximity indicator may be the signal strength of the received PDU or some value derived from it (such as an estimated distance from the originating Wi-Fi device). In the case where only presence (as opposed to proximity) is required, the proximity indicator might not be included.

In another embodiment, PRD 104 may create a single Proximity Event corresponding to the aggregation of PDUs received from the same Wi-Fi device. This aggregation may use some algorithm applied to the set of signal strengths and their times of reception to generate the proximity indicator for the event.

In both embodiments, the Visitor Identifiers generated from the MAC address as processed (i.e. obfuscated) by the salt and cryptographic hash mechanism described below.

In one embodiment, PRD 104 can use permanent memory device 205 to temporarily record information regarding observations of Wi-Fi device operation and the events it generates until confirmation is received from the Central Controller 109 that the information has been received by it.

Figure 3:
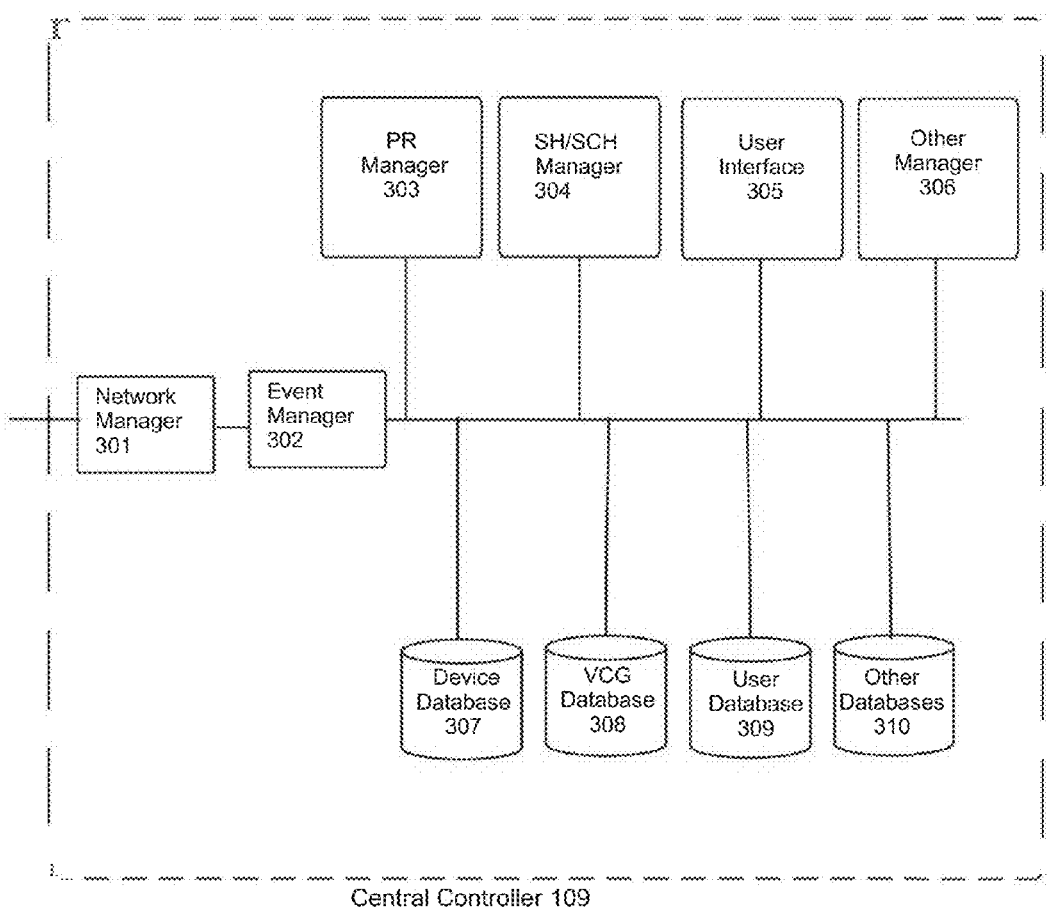
FIG. 3 is a functional diagram of the central controller (CC).

FIG. 3 presents a functional block diagram of Central Controller 109. This represents one manifestation of the functionality of a Central Controller for illustration of how the mechanisms of this invention could be added to the Central Controller of a proximity recognition system that otherwise performed only proximity recognition.

Central Controller 109 uses Network Interface 301 to communicate with the Proximity Recognizer (PR) processes running on the Proximity Recognition Devices (PRDs), the Salt Handlers (SHs) or Salt Operations Handlers (SOHs), and the PRS Operators in a manner known to those skilled in the area of information systems and communications technology.

Event Manager 302 receives the various events from the external sources (via the Network Interface 401) or from internal sources and forwards them to the appropriate manager. There are different embodiments of software architectures possible. One embodiment could be a secured web server where the external events received from the PRS Operators, SHs (or SCHs), and PRs to be processed, would be in the form of HTTPS requests.

PR Manager 303 manages the interactions with the Proximity Recognition (PR) processes running in Proximity Recognition Devices (PRDs). Typical PR Manager 303 interactions include handling request from the PRs for their SH or SCH information as well as receiving Proximity Events for Wi-Fi devices that have been detected by the PRs. The information from Proximity Events is stored in the Device Database 307 possibly after some processing or additions added to them. If a PR requested information about its SH/SCH, such information is obtained from VCG Database 308.

SH/SCH Manager 304 manages the interactions with the Salt Handler (SH) or Salt Configuration Handler (SCH). These interactions includes handling request for configuration from the SH or SCH. For these requests, the information is obtained from VCG Database 308.

User Interface 305 provides input and output functionality for the Operator of the PRS (typically the venue operator or its proxy). Typical User Interface 305 input functions for this invention are for the Operator to manage (e.g. create, delete, change) the configuration for the VCGs. This configuration for each VCG may include which PRDs are in it, settings for determining locations for its SH (or SCH and SOH), along with the settings for its salt options and hash options. Changes made to VCG configurations are stored in VCG Database 308. Authorization of which operators are allowed to make which changes to this configuration are controlled by the settings in User Database 309.

User Interface 305 may also support other interactions with the Operator required for a PRS. This may include request for overall counts and the visit frequencies of their visitors, traffic patterns during visits (i.e. dwell times at, and movements between, different locations within a venue). The responses to these requests may be generated directly from the information in the Proximity Events stored by PR Manager 303 in Device Database 307 with other information from Other Databases 310. The data from the Device Database 307 may also have been first processed by Other Manager 306 and stored in other summarized formats in Other Databases 310. Some or all of the responses may be generated from this summarized data.

Figure 4:
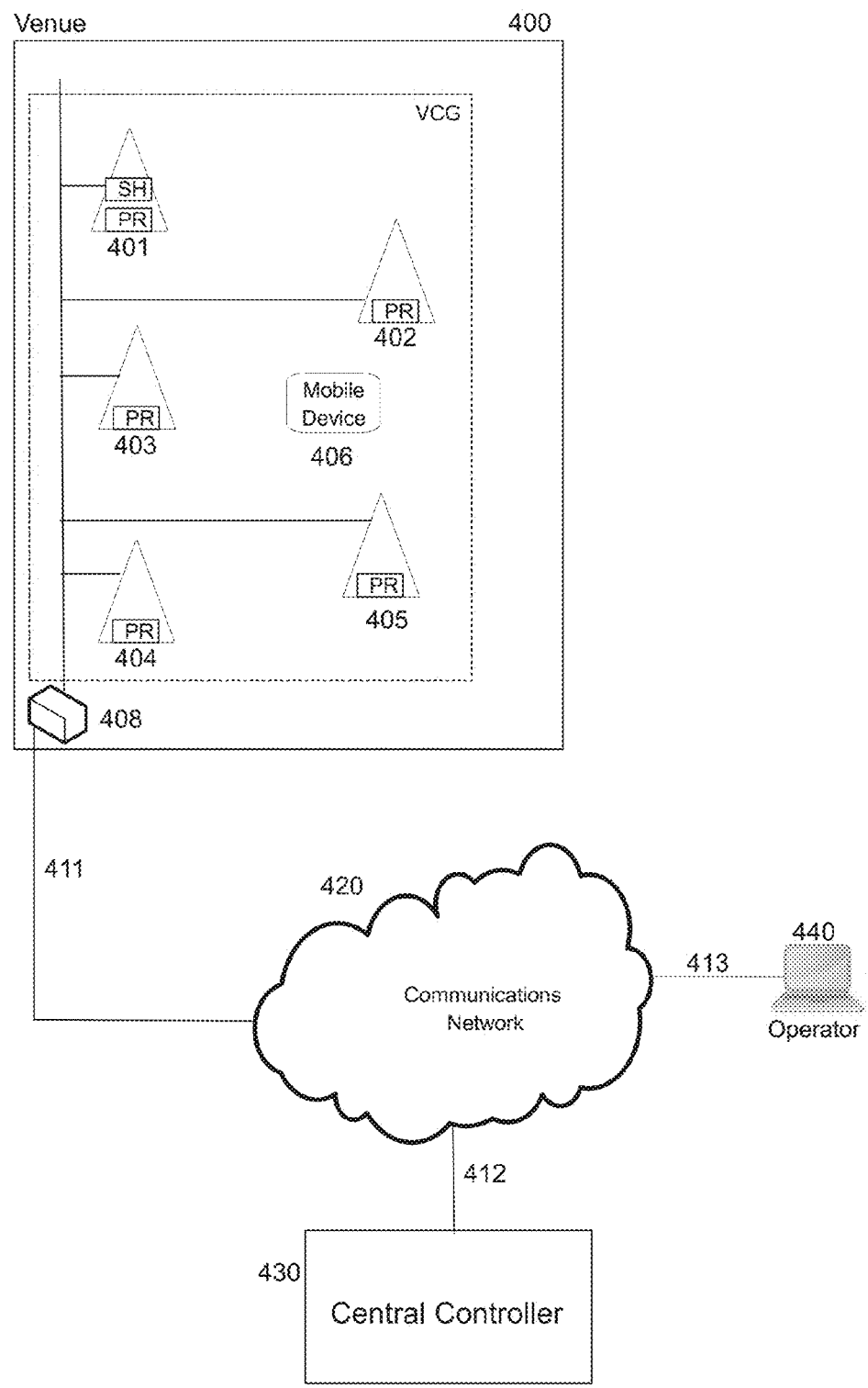
FIG. 4 is a system deployment example of a proximity recognition system (PRS) with one visitor correlation group (VCG).

FIG. 4 presents an exemplary system deployment of a PRS with a single VCG.

Continuing with FIG. 4, this deployment has five Proximity Recognition Devices (PRDs) 401, 401, 403, 404, 405 at a single venue 400. Each of these is running the Proximity Recognizer (PR) logic and has been placed in the same Visitor Correlation Group (VCG) 407. PRD 401 is also running the Salt Handler (SH) logic. They are all connected to an access point 408. Access point 408 is connected to communications network 420 (via link 411). Central Controller 430 and Operator 440 are also connected to network 420 (via links 412 and 413 respectively).

The PRs in PRDs 401, 402, 403, 404, and 405 will obtain the network address and client side authentication information for the SH from Central Controller 430. The PRs will use this to connect to the SH. This authentication may use a secure industry standard authentication mechanism such as SSH or HTTPS. The PRs will then obtain the currently active salt for the VCG and the hash settings from the SH.

Since the SH is located on one of the PRDs, there are many communications options between the PRDs and the SH in this configuration. For example this communication may be restricted behind a firewall from the Central Controller, on its own virtual LAN (VLAN), or via a direct mesh wireless communications between the PRDs.

The Proximity Recognition processes (PRs) in PRDs 401, 402, 403, 404, 405 will combine the then active salt (for that VCG) with the MAC address from any PDU they receive from Wi-Fi device 406 and apply the configured hash function to generate a Visitor Identifier to use for this reading. They may then generate a Proximity Event from this or a series of readings from Wi-Fi device 406. This Proximity Event includes a time and a proximity indicator (based on the signal strength of the PDU or set of PDUs). This Proximity Event may be forwarded to Central Controller 430.

As long as a PR uses the same active salt and the same hash function, it will generate the same Visitor Identifier every time it receives the MAC address in a PDU from Wi-Fi device 406.

Since they are also using the same salt and the same hash function, the PRs in all five PRDs 401, 402, 403, 404, 405 in this VCG will generate the same Visitor Identifier when they receive a PDU from Wi-Fi device 406.

Central Controller 430 can correlate the Proximity Events from the PRs of PRDs 401, 402, 403, 404, 405 in this VCG to determine how long Wi-Fi device 406 stayed at venue 400 (from the times of the events) and to detect movement of Wi-Fi device 406 within the venue (based on the times and proximity indicator values from the events and which PRs they were received from).

Operator 440 may request and obtain data on how long Wi-Fi device 406 has currently been detected at venue 400 (current visit), how often and how long it has been detected there in the past (previous visits and their lengths) and/or its traffic pattern during this or previous visits (movement between different departments and/or locations within the venue).

Operator 440 may also request and obtain such information as overall counts and average visit lengths for a plurality of visitors (from a plurality of detected Wi-Fi devices).

This deployment example only shows one Operator 440 for this Proximity Recognition System (PRS) instance. There could be a plurality of Operators with different authorizations. For example, there could be one Operator with administrative authority which would be authorized to change configurations (such as that of the VCG) and another Operator with operations authority that would not be allowed to change configurations but could make all queries regarding visitors.

The original MAC address of the Wi-Fi device 406 is not available to the Central Controller 430 or Operator 440. The MAC addresses have been anonymized to a Visitor Identifier at the source (at PRDs 401, 402, 403, 404, 405) for each Proximity Event. The Central Controller 430 has no knowledge of or ability to obtain or determine the salt that was used to generate this identifier.

Figure 5:
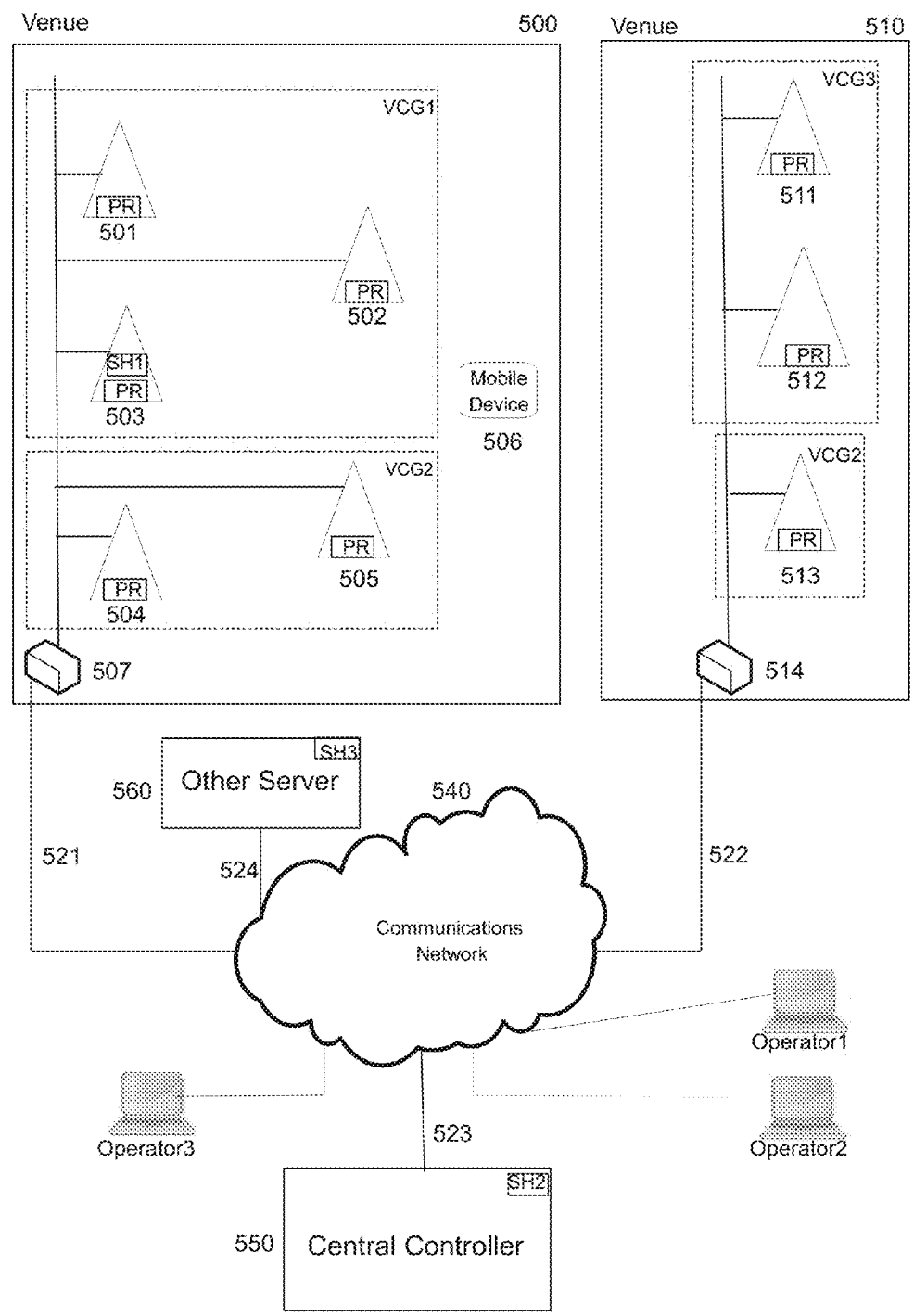
FIG. 5 is a system deployment example of a proximity recognition system (PRS) with multiple visitor correlation groups (VCGs) across two venues, representing different options for the location of their Salt Handlers (SHs).

FIG. 5 shows an exemplary system deployment of a proximity recognition system (PRS) with multiple visitor correlation groups (VCGs) across two locations, representing different options for the location of their Salt Handlers (SHs).

Continuing with FIG. 5, in this example there are three Visitor Correlation Groups (VCGs). VCG1 contains the PRDs 501, 502, 503 all at Physical Location 500. Its SH (SH1) is located on PRD 503.

VCG2 contains PRDs 504 and 505 at venue 500 as well as PRD 513 at venue 510. Thus it is deployment of a VCG that spans multiple locations (e.g. buildings). If Wi-Fi Device 506 also visited venue 510, that visit could be detected. An example might be a large venue with multiple buildings with an operator wishing to detect common visitors or flow patterns between them. In this case, its SH (SH2) is located with the Central Controller. Since SH2 spans venues, having a local SH may be of less interest in this case (i.e. due to network connectivity restrictions between the physical locations).

VCG3 contains PRDs 511, 512 both at venue 510. Its shows a deployment where its SH (SH3) is located on Other Server 560. There are a number of possible different deployments with different locations for this server: on a computer or dedicated device at venue 510, on a specific Operator computer, co-located with the Central Controller or in the cloud.

In this deployment, there are three Operators with Operator1 managing the instance of a PRS containing VCG1, Operator2 managing the instance of a PRS containing VCG2, and Operator3 managing the instance of a PRS containing VCG3. This deployment might represent a situation where Operator1 and Operator3 are working for stores within a multi-site venue (e.g. a mall) and Operator2 is working for the owner of the multisite venue.

Continuing with FIG. 5, the same Wi-Fi device 506, might be seen at the same or different times by both the PR on PRD 503 from VCG1 and the PR on PRD 505 from VCG2. Since these two PRDs are in different VCGs, they are using different salts and therefore their PRs will generate different Visitor Identifiers from the same MAC address of Wi-Fi device 506. Thus, there is no correlation between the readings from the PRDs in the different VCGs. They have been segmented (based on VCG boundaries) at the source (at the PRDs).

Figure 6:
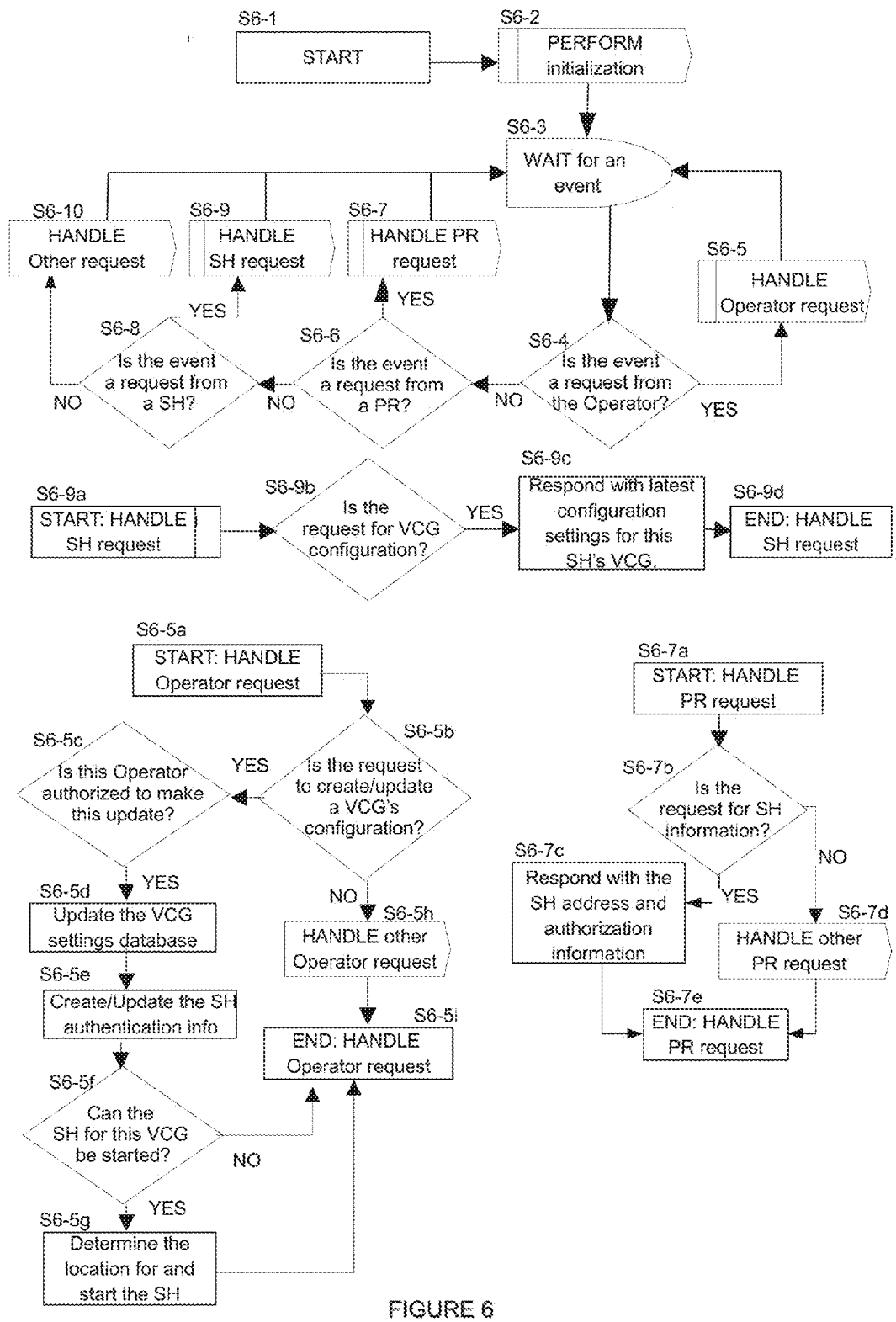
FIG. 6 is a logic diagram showing the process of the additions to the logic of the Central Controller (CC).

FIG. 6 presents a flowchart of the steps of the Central Controller (CC).

Processing starts at Step S6-1 and immediately proceeds to Step S6-2 in which all initialization functions are performed.

Once initialization is complete, the CC proceeds to Step S6-3, where it waits for an event. Upon reception of an event it checks in Step S6-4 if it is a request from the Operator (i.e. via the User Interface 305) moving to sub-task Step S6-5 (see description below) if so. If not, it checks in Step S6-6 if it is a request from a PR, moving to sub-task Step S6-7 (see description below) if so. If not, it checks in Step S6-8 if it is a request from a SH, moving to sub-task Step S6-9 (as explained below) if so. If not, it moves to Step sub-task S6-10 to handle any other events received. Sub-task Step S6-10 handles other CC events that are outside of this invention. Upon the completion of the sub-task for the event, the flow of control returns to Step S6-3 to await the next event.

Processing of sub-task Step S6-5 (Handle Operator request) starts at Step S6-5*a* and proceeds immediately to Step S6-5*b* to check if this is a request to create a new VCG or update the configuration of an existing VCG. If so, processing proceeds to Step S6-5*c*. If not, processing proceeds to Step S4-5*h* to handle any other Operator request (which are outside of this invention).

Step S6-5*c* determines, using User Database 309, whether this operator is authorized to make this change to the VCG configuration. If so, processing proceeds to Step S6-5*d*.

This VCG configuration changes may include: 1) the PRDs that are in the VCG, 2) the option to locate the SH for this VCG, 3) the salt options for this VCG and 4) the hash options for this VCG.

The options available for 2) the location of the SH, may include: 2a) at the Central Controller, 2b) on a different server at a specified location (possibly on a computer at the venue site or a specific company computer or in the cloud), 2c) on a specified PRD, 2d) on a PRD chosen by the Central Controller logic (randomly or via some algorithm), or 2e) on a PRD, as chosen by the PR's logic (randomly or via some algorithm).

The options available for 3) the salt options, may include: 3a) the size of the salt to generate, and 3b) the duration of time to use it.

The options available for 4) the hash options, may include: 4a) the mechanism for combining the salt with the MAC address, 4b) the hash function to use (e.g. SHA-512).

In Step S6-5*d*, VCG Database 308 is updated for the change. Processing proceeds to Step S6-5*e* wherein the SH authentication information in it is updated based on the change if necessary. Processing then proceeds to Step S6-5*f*.

Step S6-5*f* checks first whether the SH for this VCG can be started (its configuration is complete) and then whether it has not yet been started. If so, Step S6-5*g* is executed wherein the SH is started at the location determined by the settings of 2) above.

Processing of sub-task Step S6-5 ends at Step S6-5*i* and returns to Step S6-3.

Processing of sub-task Step S6-7 (Handle PR request) starts at Step S6-7*a* and proceeds immediately to Step S6-7*b* to check if this request for the SH information for this PR. If so, processing proceeds to Step S6-7*c*. If not, processing proceeds to Step S6-5*d* to handle any other PR request.

In Step S6-7*c*, the network address of the SH and client side authentication information (for this PR to use for connecting to it) are obtained from VCG Database 308 and sent to the PR.

Processing of sub-task Step S6-7 ends at Step S6-7*e* and returns to Step S6-3.

Processing of sub-task Step S6-9 (Handle SH request) starts at Step S6-9*a* and proceeds immediately to Step S6-9*b* to check if this request from the SH, is for the VCG configuration. If so, processing proceeds to Step S6-9*c*.

In Step S6-9*c*, the VCG configuration information is obtained from the VCG Database 308 and sent to the SH. This VCG configuration may include: 1) the PRDs that are in the VCG, 2) the server side authentication information for authenticating PR connections to it, 3) the salt options for this VCG and 4) the hash options for this VCG.

Processing of sub-task Step S6-9 ends at Step S6-9*d* and returns to Step S6-3.

Figure 7:
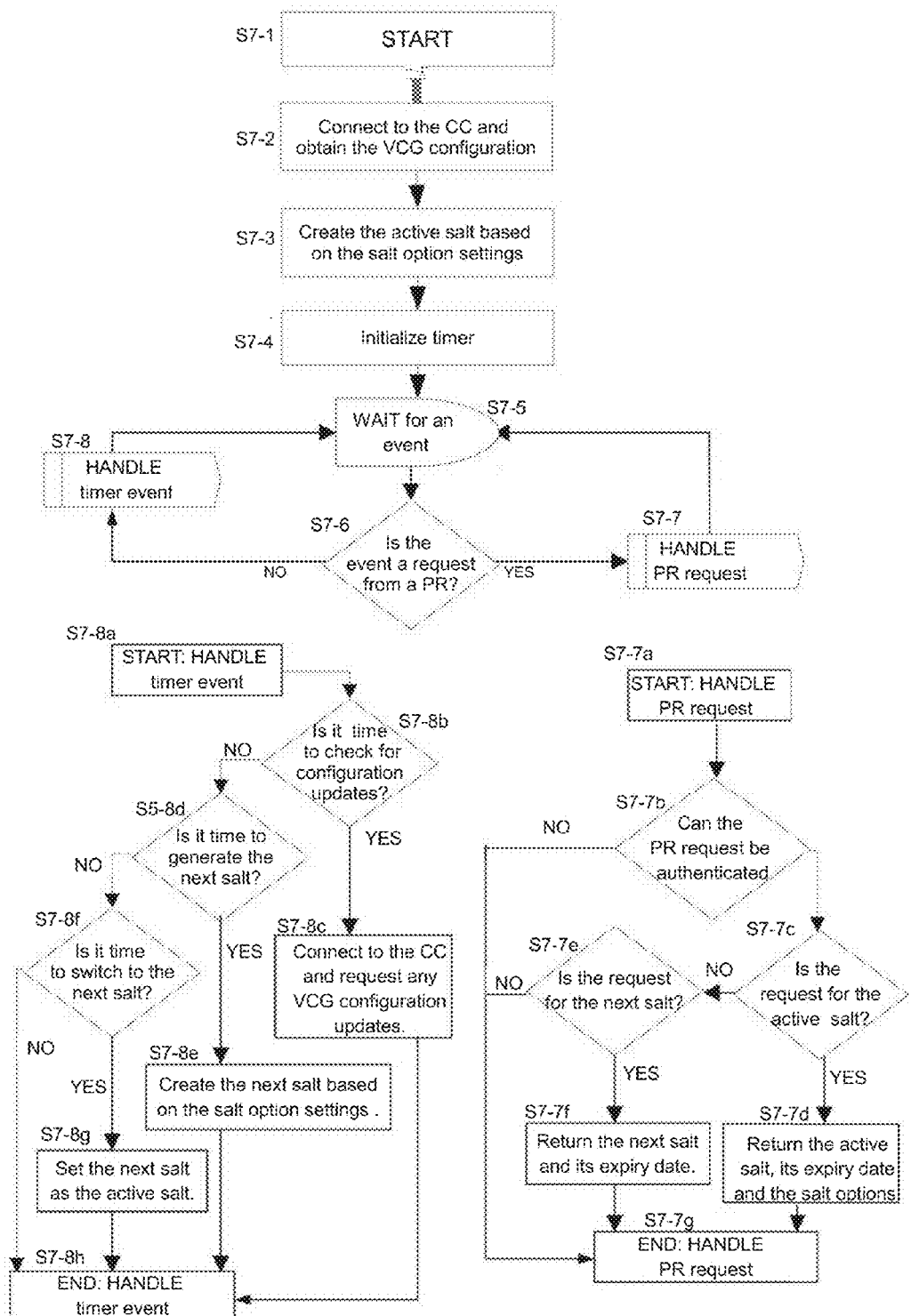
FIG. 7 is a logic diagram showing the process of the Salt Handler (SH).

FIG. 7 presents a flowchart of the steps performed by the Salt Handler (SH). This is one manifestation of how the SH could be designed (using an event loop and timers to deal with internal events. Other designs are possible within the scope of average skilled man.

Processing starts at Step S7-1 and immediately proceeds to Step S7-2. In this step, the SH connects to the Central Controller (CC) and obtains the VCG configuration.

This VCG configuration may include: 1) the PRDs that are in the VCG, 2) the server side authentication information for authenticating PR connections to it, 3) the salt options for this VCG and 4) the hash options for this VCG. the hash options may include: a) the mechanism for combining the salt with the MAC address, b) the hash function to use (i.e. SHA-512).

The options available for 3) the salt options may include: 3a) the size of the salt to generate, and 3b) the duration of time to use it.

After Step S7-2 processing proceeds to Step S7-3. In Step S7-3, the active salt is created based on the salt options settings using an industry standard random number generation mechanism. The expiry date for the salt is calculated based on the salt option setting for it. The processing then proceeds to Step S7-4.

In Step S7-4, the timer(s) are initialized. This might be a single timer that generates periodic time to check events or individual timers for each periodic task. The processing proceeds to Step S7-5.

In Step S7-5, the SH waits for an event. Upon reception of an event, it checks in Step S7-6 if it is a request from a PR, moving to sub-task Step S7-7 (see description below) if so. If not, it proceeds to sub-task Step S7-8 (see description below). Upon the completion of the sub-task for the event, the flow of control returns to Step S7-5 to await the next event.

Processing of sub-task Step S7-7 (Handle PR request) starts at Step S7-7*a* and proceeds immediately to Step S7-7*b* to check if this request can be successfully authenticated based on the server side authentication information (obtained as part of the VCG configuration from the CC in Step S7-2). If so, it proceeds to Step S7-7*c*.

Step S7-7*c* checks whether this is a request for the active salt. If so, processing proceeds to Step S7-7*d*. If not, Step S7-7*e* is executed to check whether this is a request for the next salt. If so, processing proceeds to Step S7-7*f*.

In Step S7-7*d*, the active salt and its expiry date (generated in Step S7-3) along with hash options (obtained as part of the VCG configuration from the CC in Step S7-2) are sent to the PR.

In Step S7-*f*, the next salt and its expiry date (generated in Step S7-8*e*) is sent to the PR.

Processing of sub-task Step S7-7 ends at Step S7-7*g* and returns to Step S7-5.

Processing of sub-task Step S7-8 (Handle timer event) starts at Step S7-8*a* and proceeds immediately to Step S7-8*b* which asks if it is time to check for configuration updates. If so, processing proceeds to Step S7-8*c*. If not, Step S7-8*d* checks if it is time to generate the next salt. If so, processing proceeds to Step S7-8*e*. If not, Step S7-8*d* checks if it is time to switch to the next salt. If so, processing proceeds to Step S7-8*g*.

In Step S7-8*c*, the SH connects to the Central Controller (CC) and obtains the latest VCG configuration.

In Step S7-8*e*, the next salt is created based on the salt options settings using an industry standard random number generation mechanism. The expiry date for the next salt is calculated based on the salt option setting for it.

In Step S7-8*g*, the next salt is set as the active salt.

Processing of sub-task Step S7-8 ends at Step S7-7*h* and returns to Step S7-5.

Figure 8:
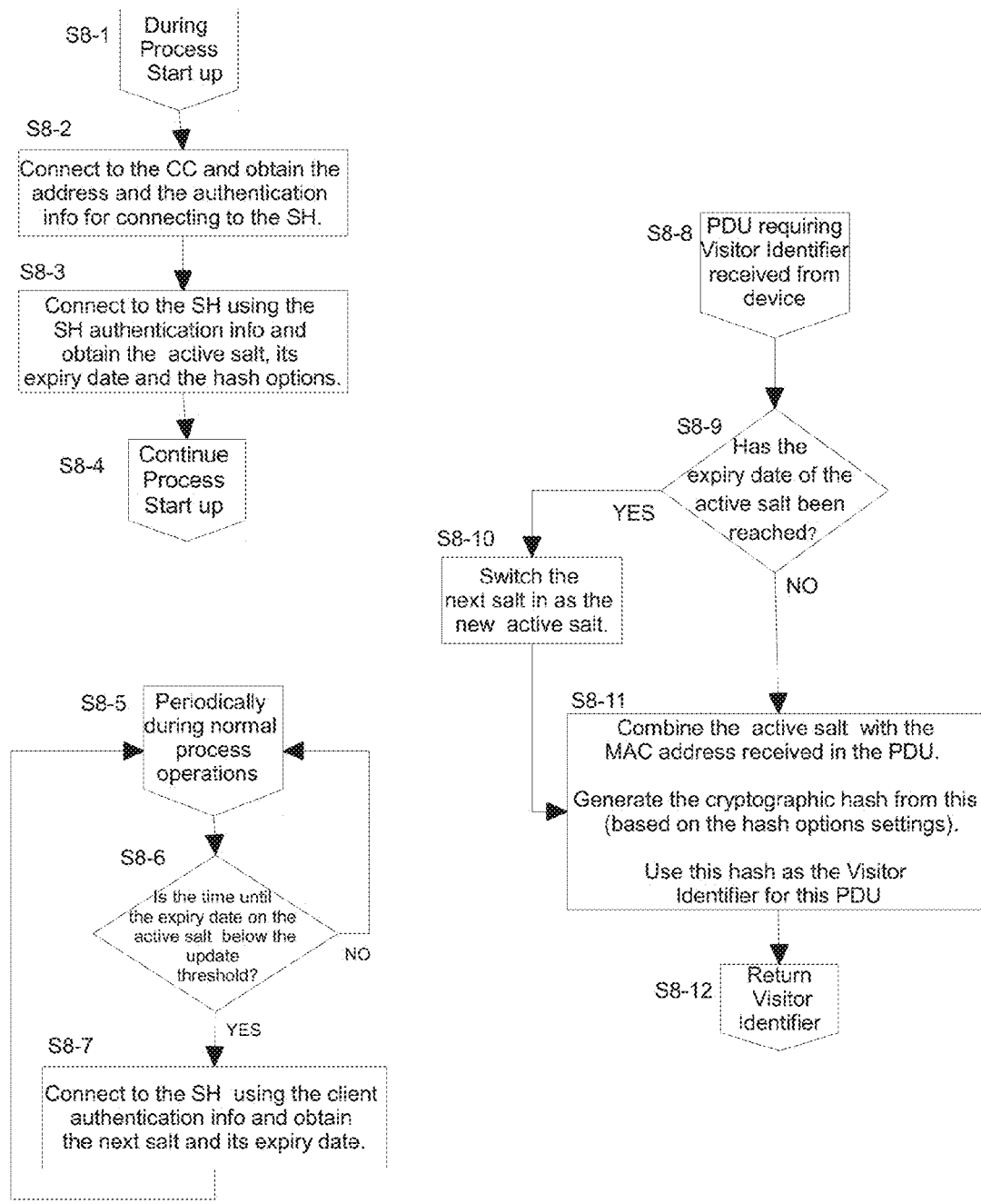
FIG. 8 is a logic diagram showing the process of the additions to the logic of the Proximity Recognizer (PR) process on the Proximity Recognition Device (PRD).

FIG. 8 presents a flowchart of the steps added to the Proximity Recognizer (PR) process on a Proximity Recognition Device (PRD). This is an example only as an implementation detail. Step S8-1 is the trigger point or call from the existing PR process at some point during its initialization phase. Processing proceeds immediately from it to Step S8-2.

In Step S8-2, the PR connects to the Central Controller (CC) and obtains the network address for its Salt Handler (SH) along with the client side authentication information (for this PR to use for connecting to the SH). Processing then proceeds to Step S8-3.

In Step S8-3, the PR connects to the SH (using the authentication information) and obtains the active salt, its expiry date and the hash options to use for the generation of Visitor Identifiers. The hash options may include: a) the mechanism for combining the salt with the MAC address, b) the hash function to use (i.e. SHA-512). Processing then proceeds to Step S8-4.

Step S8-4 is the return to the existing PR process initialization phase.

Step S8-5 is the trigger point or call from the existing PR process that is to be made periodically during its normal process operation (such as a periodic timer call or call from within an operations loop). Processing proceeds immediately from it to Step S8-6.

Step S8-6 checks whether it is time to obtain the next salt (based on the expiry date of the active salt). If so, processing proceeds to Step S8-7.

In Step S8-7, the PR connects to the SH (using the authentication information) and obtains the next salt and its expiry date.

Step S8-8 is the trigger point or call from the existing PR process when it has received a PDU from a Wi-Fi device that it wants to use in the generation of a Proximity Event and thus requires a Visitor Identifier for it. It passes in the MAC address from the PDU. Processing proceeds immediately from it to Step S8-9.

Step S8-9 checks whether it is time to switch the next salt (based on the expiry date of the active salt). If so, processing proceeds to Step S8-10. If not, processing proceeds directly to Step S8-11.

In Step S8-10, the next salt is switched in as the new active salt. Processing then proceeds to Step S8-11.

In Step S8-11, the MAC address and the salt are combined (in the manner configured by the hash options obtained in Step S8-3) to generate the cryptographic hash from them. This hash is set as the Visitor Identifier. Processing then proceeds to Step S8-12.

In Step S8-12 the generated Visitor Identifier is returned to the existing PR process.

Figure 9:
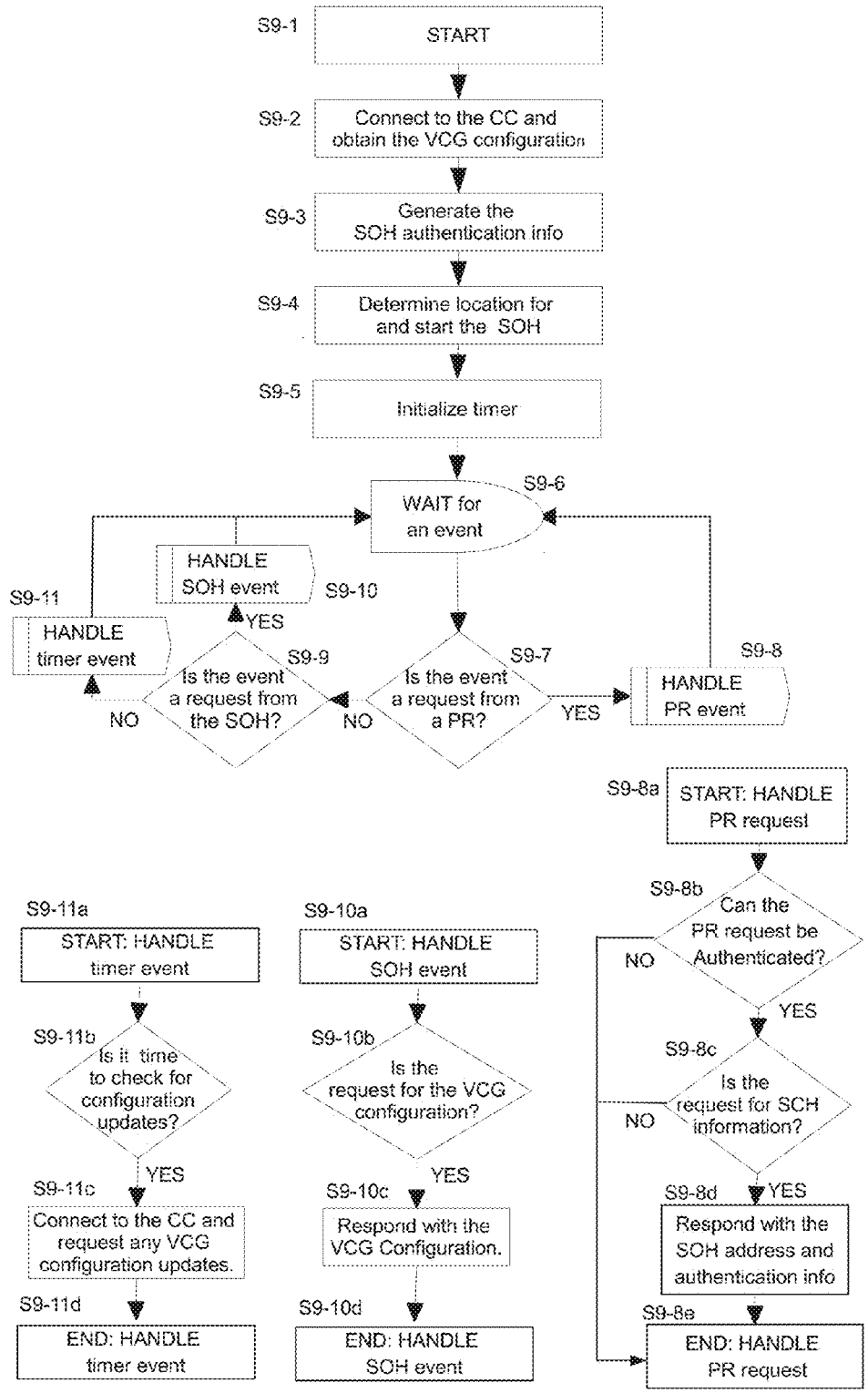
FIG. 9 is a logic diagram showing the process of the Salt Configuration Handler (SCH).

FIG. 9 presents a flowchart of the steps performed by the Salt Configuration Handler (SCH). In this embodiment, the functionality of the Salt Handler (SH) is split between the Salt Configuration Handler (SCH) and the Salt Operations Handler (SOH). This is one manifestation of how the SCH could be designed (using an event loop and timers to deal with internal events). Other designs are possible.

Processing for the SCH starts at Step S9-1 and immediately proceeds to Step S9-2 where the SH connects to the Central Controller (CC) and obtains the VCG configuration.

This VCG configuration will be the same as for the embodiment with the combined SH with the addition of a configuration setting for the location for the SOH. The options available for the location of the SOH may include: a) at the Central Controller, b) on a different server at a specified location, c) on a specified PRD, or d) on a PRD chosen by the SCH logic (randomly or via some algorithm).

After Step S9-2 is finished, the processing proceeds to Step S9-3. In Step S9-3, the SOH authentication information is generated for the SOH and all the PRs in the VCG. The processing then proceeds to Step S9-4.

In Step S9-4, the SOH is started at the location determined based on the configuration setting obtained in Step S9-2 for its location.

In Step S9-5, the timer(s) are initialized. This might be a single timer that generates periodic time to check events or individual timers for each periodic task. The processing proceeds to Step S9-6.

In Step S9-6, the SCH waits for an event. Upon reception of an event it checks in Step S9-7 if it is a request from a PR, moving to sub-task Step S9-8 (see description below) if so. If not, it proceeds to Step S9-9 to check whether this is an SOH event. If so, processing proceeds to sub-task Step S9-10 (see description below). If not, processing proceeds to sub-task Step S9-11 (see description below). Upon the completion of the sub-task for the event, the flow of control returns to Step S9-6 to await the next event.

Processing of sub-task Step S9-8 (Handle PR request) starts at Step S9-8*a* and proceeds immediately to Step S9-8*b* to check if this request can be successfully authenticated based on the server side SCH authentication information (obtained as part of the VCG configuration from the CC in Step S9-2). If so, it proceeds to Step S9-8*c*.

Step S9-8*c* checks whether this is a request for the SCH information. If so, processing proceeds to Step S9-8*d*.

In Step S9-8*d*, the network address of the SOH and the authentication information necessary for this PR to connect to it (which was generated in step S9-3) is sent to the PR.

Processing of sub-task Step S9-8 ends at Step S9-8*e* and returns to Step S9-6.

Processing of sub-task Step S9-10 (Handle SOH event) starts at Step S9-10*a* and proceeds immediately to Step S9-10*b* to check if this is a request for the VCG configuration. If so, processing proceeds to Step S9-10*c*.

In Step S9-10*c*, the VCG configuration (which was obtained in step S9-11*c*) and the information necessary for the SOH to authenticate the PRs in the VCG (which was generated in step S9-3) is sent to the SOH.

Processing of sub-task Step S9-10 ends at S9-10*d* and returns to Step S9-6.

Processing of sub-task Step S9-11 (Handle timer event) starts at Step S9-11*a* and proceeds immediately to Step S9-11*b* to check if this time to check for configuration updates. If so, processing proceeds to Step S9-11*c*.

In Step S9-11*c*, the SCH connects to the Central Controller (CC) and obtains the latest VCG configuration.

Processing of sub-task Step S9-11 ends at S9-11*d* and returns to Step S9-6.

Figure 10:
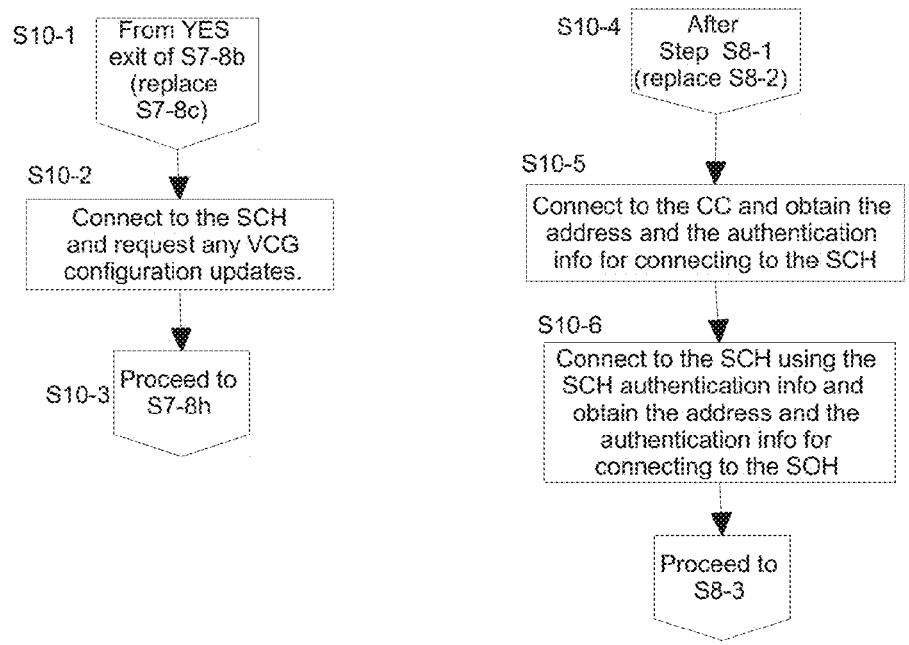
FIG. 10 is a logic diagram showing the changes in the Central Controller (CC), Salt Handler (SH) and Proximity Recognizer (PR) processes for the embodiment of the invention where the Salt Handler's functionality is split into Salt Configuration Handler (SCH) and Salt Operations Handler (SOH).

FIG. 10 presents a flowchart describing the replacement steps in the Salt Handler (SH) and Proximity Recognizer (PR) for the embodiment where the functionality of the Salt Handler (SH) is split between the Salt Configuration Handler and the Salt Operations Handler (SOH).

For this embodiment, the Salt Handler (SH) logic of FIG. 7 becomes the logic of the Salt Operations Handler (SOH) with the one change that Step S7-8*c* is replaced by Step S10-2. That is, it connects to the SCH (the logic of which is described in FIG. 9) rather than the CC to obtain VCG configuration updates.

For this embodiment, the logic of the Proximity Recognizer process (PR) of FIG. 8 is the same except Step S8-2 is replaced by steps S10-5 and S10-6 and all other references to SH are equivalent to references to SOH. That is, it first, in Step S10-5, connects to the CC to obtain the network address and authentication information for connecting to the SCH. Then in Step S10-6 it connects to the SCH using this SCH authentication information and obtains the network address and authentication information for connecting the SOH. It then proceeds to step S8-3 treating the SH and SOH as equivalent in the rest of the logic of FIG. 8.

For this embodiment, the logic of the Central Controller (CC) of FIG. 6 is the same except all references to SH are equivalent to references to SCH. It also has the addition to the VCG configuration of the setting for the location for the SOH (as described in Step S9-2).

Figure 11:
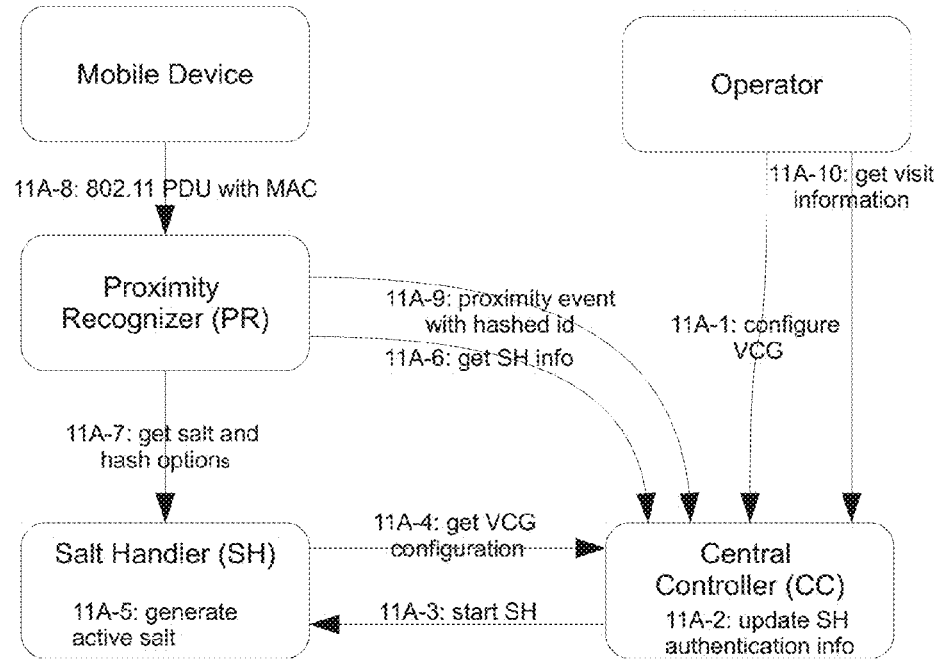
FIG. 11 is a communication flow diagram showing the time order of communications between and within the different entities of the Proximity Recognition System which illustrates the changes between the embodiments where the SH process is singularly located and where it is split into the SCH and SOH.
Figure 11:
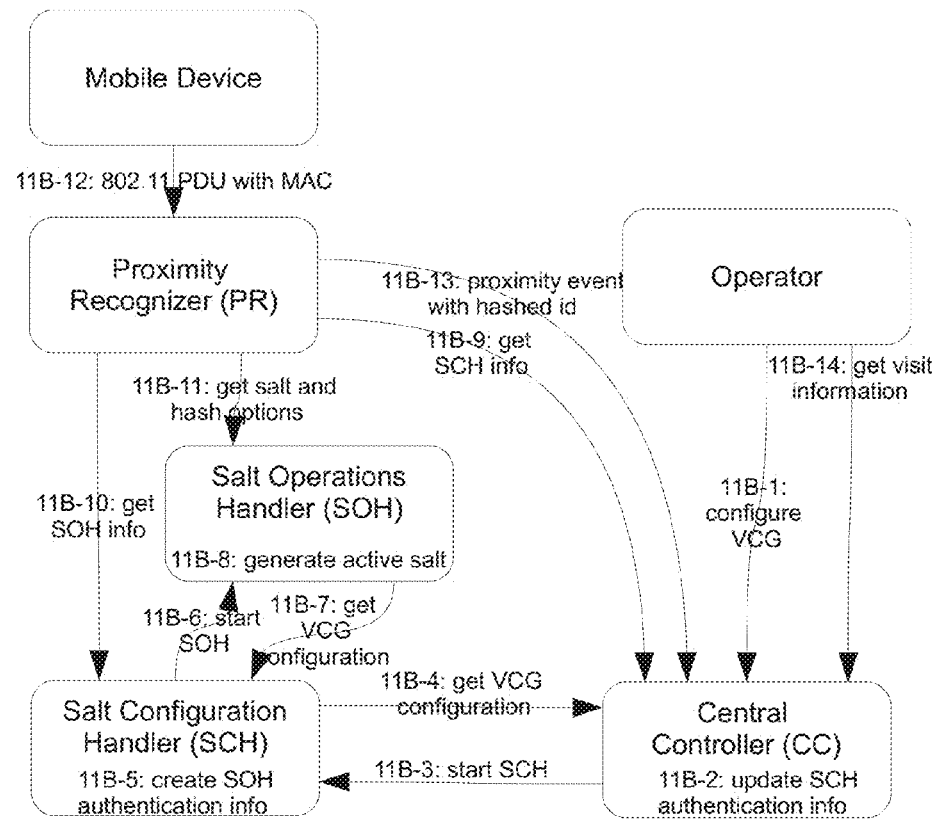

FIG. 11 presents a communication flow diagram showing the time order of communications between and within the different entities of the Proximity Recognition System (PRS) for two embodiments of this invention. The first embodiment has a combined Salt Handler (SH), the second has the functionality of the SH split between two separate processes—Salt Configuration Handler (SCH) and Salt Operations Handler (SOH).

Continuing with FIG. 11, starting on sub-diagram 11A (for the combined SH embodiment), the first step is Step 11A-1 wherein the Operator configures the VCG in the Central Controller (CC). This may trigger the Central Controller (CC) to, in Step 11A-2, update the authentication information and then if the configuration is complete it may trigger the CC to perform step 11A-3 where it determines the location for and starts the Salt Handler (SH).

Continuing with sub-diagram 11A, the SH will start and first perform Step 11A-4 wherein it obtains the Visitor Correlation Group (VCG) configuration including the information to authenticate the PRs in its VCG. Then in Step 11A-5 it generates the active salt (based on the salt options that were part of the VCG configuration obtained in Step 11A-4).

Continuing with sub-diagram 11A, each Proximity Recognizer (PR) process on each Proximity Recognition Device (PRD) will perform Step 11A-6 to get the network address and authentication information for its SH. It will then perform step 11A-7 connect to the SH (using the network address and authentication information obtained in Step 11A-6) and obtain the active salt and the hash options (which were part of the VCG configuration the SH obtained in Step 11A-4).

Continuing with sub-diagram 11A, the PR's will receive 802.11 PDUs from Wi-Fi Devices in Step 11A-8, convert the MAC addresses using the salt and based on the hash settings (both obtained in Step 11A-7) generate a Visitor Identifier. Then the PR may (based on one or more received PDUs in Step 11A-9 and send a Proximity Event with this Visitor Identifier to the CC.

Continuing with sub-diagram 11A, the Operator in Step 11A-10 may get visit information from the CC based on many Proximity Events it has received from PRs in the same VCG (received in Step 11A-9).

Continuing with FIG. 11, moving on to sub-diagram 11B (for the embodiment with the SCH and SOH) most of the steps are equivalent other than a few additions. To highlight just the differences: steps 11B-5, 11B-6, 11B-7, and 11B-10 are added. The SCH generates the authentication information for the connections between the PRs and the SOH (in Step 11B-5) and determines its location (based on VCG configuration) and starts the SOH (in Step 11B-6). The SOH gets the VCG configuration via the SCH (in Step 11B-7). The PRs connect to the SCH (Step 11B-10) to obtain the network address and authentication information for the SOH. Only the SCH connects to the CC. The SOH is completely isolated from it.

Figure 12:
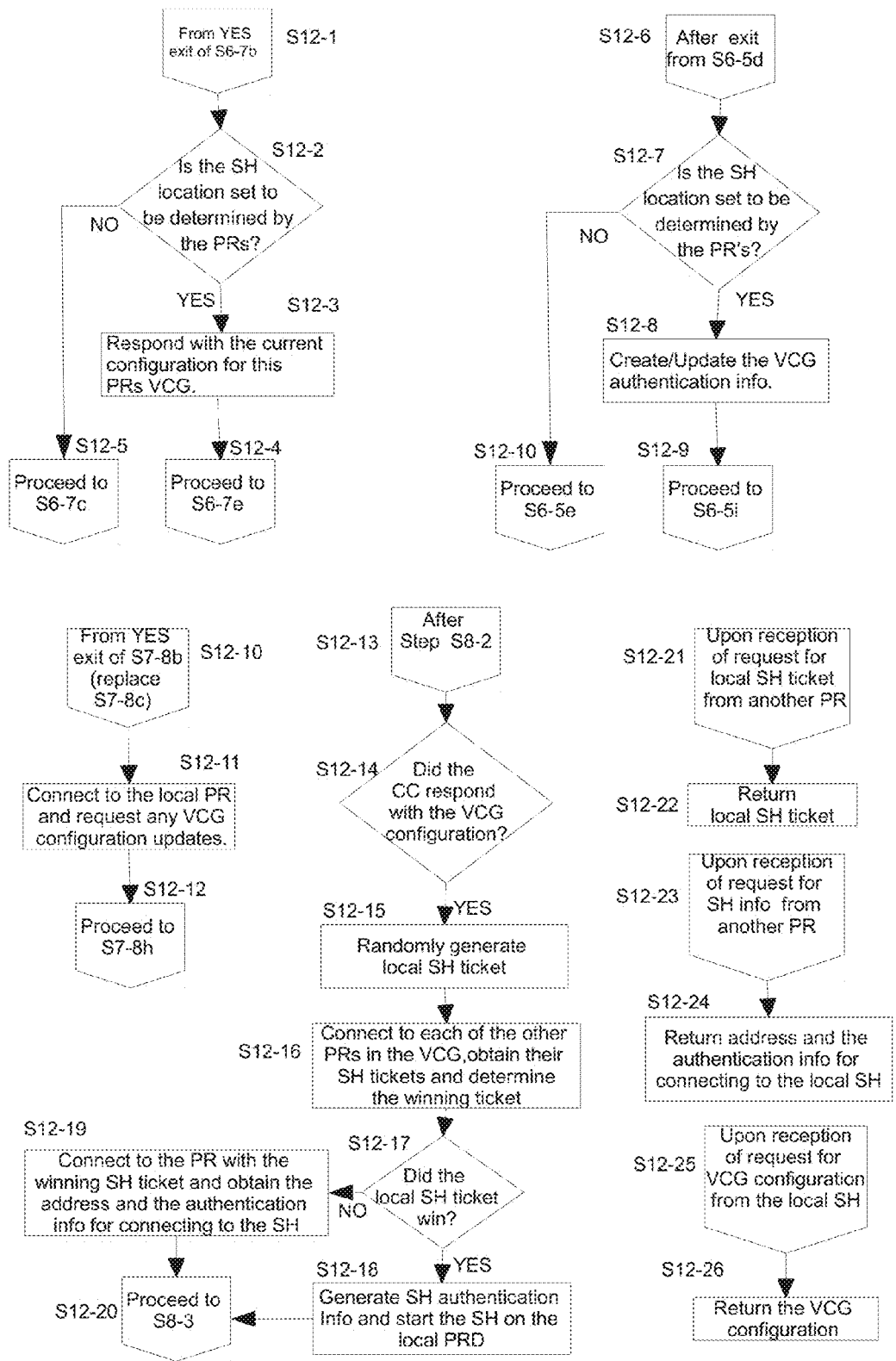
FIG. 12 is a logic diagram highlighting the changes in the Central Controller, Salt Handler and Proximity Recognizer for the embodiment of the invention where the SH location is determined by the PRs of their VCG.

FIG. 12 presents a flowchart of the replacement steps in the Central Controller (CC), Salt Handler (SH) and Proximity Recognizer (PR) for the embodiment of this invention where the location of the Salt Handler (SH) can be configured to be determined by the PRs.

In this embodiment steps S12-2 and S12-3 are inserted on the YES link out of Step S6-7*b* of FIG. 6 (where it has been determined that a PR is requesting the SH information from the CC).

Step S12-2 checks if the SH location has been configured by the Operator to be determined by the PRs. If so, processing proceeds to Step S12-3 wherein the CC responds with the latest configuration settings for this PR's VCG. Then processing proceeds to step S6-7*e* of FIG. 6. If not, processing proceeds to Step S6-7*c* of FIG. 6.

In this embodiment steps S12-7 and S12-8 are inserted after Step S6-5*b* of FIG. 6 (where the Operator has created/updated VCG configuration for the CC).

Step S12-7 checks if the SH location has been configured by the Operator to be determined by the PRs. If so, processing proceeds to Step S12-8 where the CC generates the VCG authentication information for the PRs to connect to each other. Then processing proceeds to step S6-5*i* of FIG. 6. If not, processing proceeds to Step S6-5*e* of FIG. 6.

For this embodiment, in the Salt Handler (SH) logic of FIG. 7, Step S7-8*c* is replaced by Step S12-11. That is, it connects to its local PR rather than to the CC to obtain VCG configuration updates.

The main addition in this embodiment is a number of steps are inserted between steps S8-2 and S8-3 of FIG. 8 for the PR logic. The purpose of these steps are for the PR's to determine among themselves the location for the SH and for one of them to start it. The logic presented here is one method of several possible options for them performing this task.

After the request for the SH information from the CC in step S8-2, Step S12-14 checks whether the CC responded with the VCG configuration. If the response is that the location of the SH needs to be determined by the PRs, then processing proceeds to Step S12-15.

In Step S12-15, a local SH ticket is generated. This may be as simple as generating a random number within a large range. The value of the local SH ticket may also be generated based on suitability or desirability criteria for the SH to be located on this PRD or another (e.g. restrict to only gateway devices connected directly to the Internet or avoid placing in a devices that is suffering connectivity problems). Processing proceeds to Step S12-16.

In Step S12-16, the PR connects to all the other PR's in the VCG (using the VCG authentication information obtained from the CC) to obtain their SH tickets. It then determines which ticket wins based on the criteria in use (for example, largest value wins). Processing proceeds to Step S12-17.

Step S12-17 checks whether the local SH ticket won. If so, processing proceeds to Step S12-18—in that case, the local, "winning" PRD runs its SH 207 process to generate, maintain and disseminate the salt for the PRDs of its VCG). If the local SH ticket did not win, processing proceeds to Step S12-19.

In Step S12-18, the PR first generates and stores the SH authentication information and then starts the SH on the local PRD. Processing then proceeds to Step S8-3 of FIG. 8.

In Step S12-19, the PR connect to the PR with the winning SH ticket and obtains the network address and authentication information for connecting to the (winning PRD's) SH. Processing then proceeds to Step S8-3 of FIG. 8.

In the PR logic, when a request for the local SH ticket is received from any of the other PR's in the VCG (Step S12-21), processing proceeds to Step S12-22 wherein the local SH ticket is returned.

In the PR logic, when a request for the SH information is received from any of the other PR's in the VCG (Step S12-23), processing proceeds to Step S12-24 where the PR returns the SH authentication information (generated in Step S12-18) for the requesting PR to connect to the SH.

In the PR logic, when a request Is received from the local SH for the VCG configuration (Step S12-25), processing proceeds to Step S12-26 wherein the PR returns the VCG configuration information it obtained from the CC along with the SH authentication info (it generated in Step S12-18) for the SH to authenticate PRs connecting to it.

Figure 13:
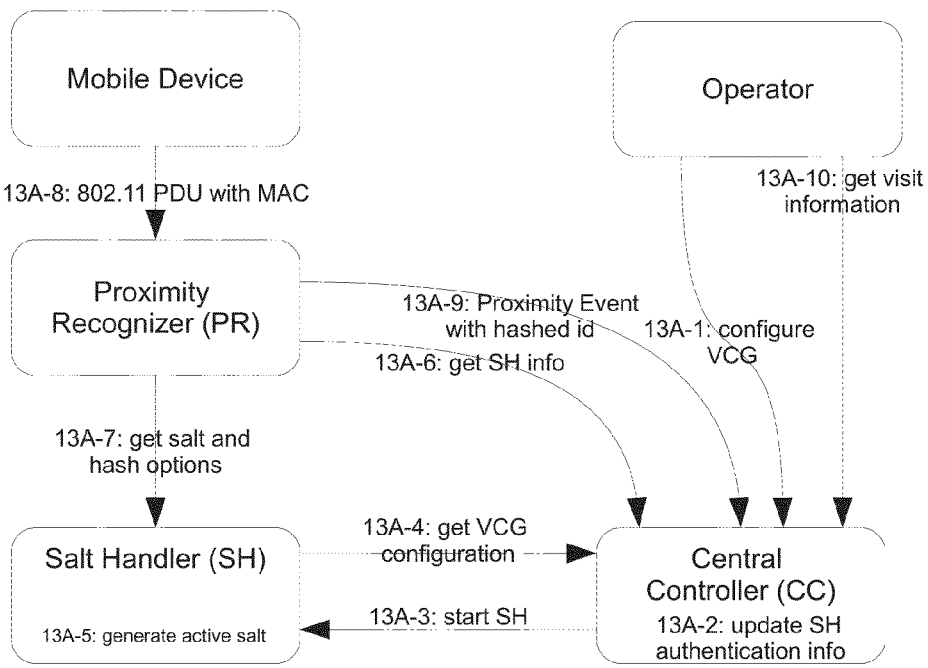
FIG. 13 is a communication flow diagram showing the time order of communications between and within the different entities of the Proximity Recognition System which illustrates the changes between the embodiment of the invention where the SH location is determined by the Operator/CC and where it is determined by the PRs.
Figure 13:
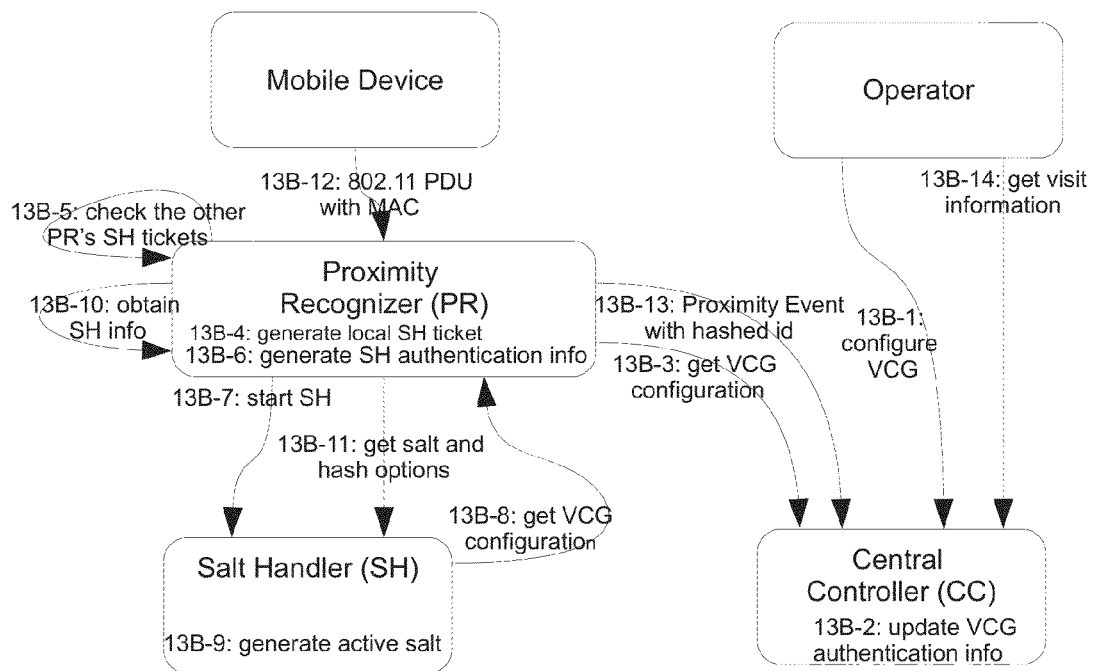

FIG. 13 presents a communication flow diagram showing the time order of communications between and within the different entities of the Proximity Recognition System (PRS) for two embodiments of this invention. The first embodiment has the location of the SH being either specified directly by the Operator in VCG configuration or by the CC; and the second has the location of the SH being determined by the PRs among themselves without the CC or Operator having any knowledge of its location.

Continuing with FIG. 13, starting on sub-diagram 13A (for the embodiment with the SH location determined the Operator or by the CC), this is the same diagram as diagram 11A of FIG. 11 and is reproduced here to aid in comparative reference only. The description for sub-diagram 11A of FIG. 11 applies here.

Continuing with FIG. 13, sub-diagram 13B (for the embodiment with the SH location determined by the PRs), the first step is Step 13B-1 wherein the Operator configures the VCG in the Central Controller. This may trigger the Central Controller (CC) in Step 13B-2 to update the VCG authentication information (i.e. if a PRD is added or removed from a VCG).

Continuing with diagram 13B, each Proximity Recognizer (PR) process 206 on each Proximity Recognition Device (PRD) will perform Step 13B-3 where they will have asked for the SH information but the CC will return the VCG configuration (indicating that the PRs will determine the location for their SH).

To accomplish this, the PRs will, in Step 13B-4, each generate a local SH ticket. They will then in Step 13B-5 each connect to all the other PRs in its VCG to check all the tickets. They will all use the same criteria for determining which ticket wins. The PR whose ticket won will perform Step 13B-6 generating the SH authentication information, followed by Step 13B-7 starting the SH 207 on its PRD.

Continuing with diagram 13B, the SH will start up and first perform Step 13B-8 wherein it obtains the VCG configuration including the information to authenticate the PRs in its VCG. Then in Step 13B-9 it generates the active salt (based on the salt options that were part of the VCG configuration obtained in Step 13B-8).

Continuing with diagram 13B, each PR that didn't have the "winning" SH ticket will perform Step 13B-10 to get the network address and authentication information for the SH from the PR that did have the "winning" SH ticket (and generated the SH authentication information in Step 13B-6 and started the SH process on its local PRD in Step 13B-7). All PRs will then perform step 13B-11, connect to the SH (using the network address and authentication information obtained in Step 13B-10) and obtain the active salt and the hash options (which were part of the VCG configuration that the SH obtained in Step 13B-8).

Steps 13B-12, 13B-13 and 13B-14 are equivalent to steps 13A-8, 13A-9, and 13A-10.

Continuing with the objective of "anonymizing" the visitor's movement, making it difficult (if not impossible) to attribute a thus obfuscated traffic pattern back to an individual visitor, other embodiments are presented. Not only is the salting performed by a PRD (i.e. the salting is performed "at source") but also under this embodiment, the generation of the salt is performed by a PRD by itself and for itself (so the "anonymizing" is truly "at source").

Recognition of visitors can be achieved passively and/or actively.

Examples of passive recognition include: by detecting electromagnetic probes sent by a device carried by the visitor (such as the Wi-Fi mobile devices described above, in conjunction with FIGS. 1-13); and by a camera detecting light rays emanating from the visitor's face (i.e. facial features).

Examples of active recognition include: by directing electromagnetic waves or mechanical waves, and measuring their "echo" or response according to the relevant communications protocol; or sending signals or messages to the visitor's Wi-fi Mobile Devices to trigger responses and detect such responses.

Figure 14:
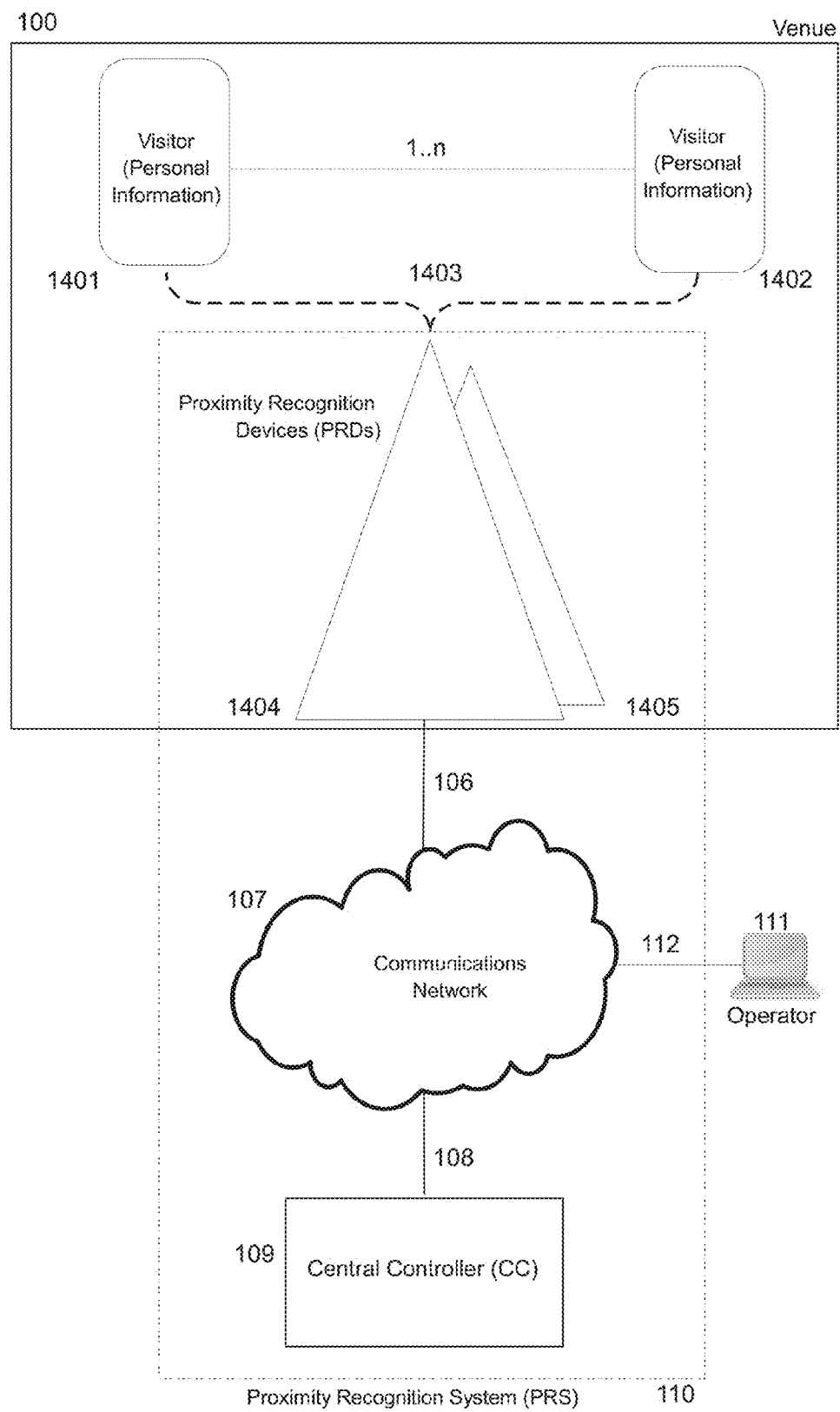
FIG. 14 is a functional block diagram of a proximity recognition system according to a further embodiment.
Figure 15:
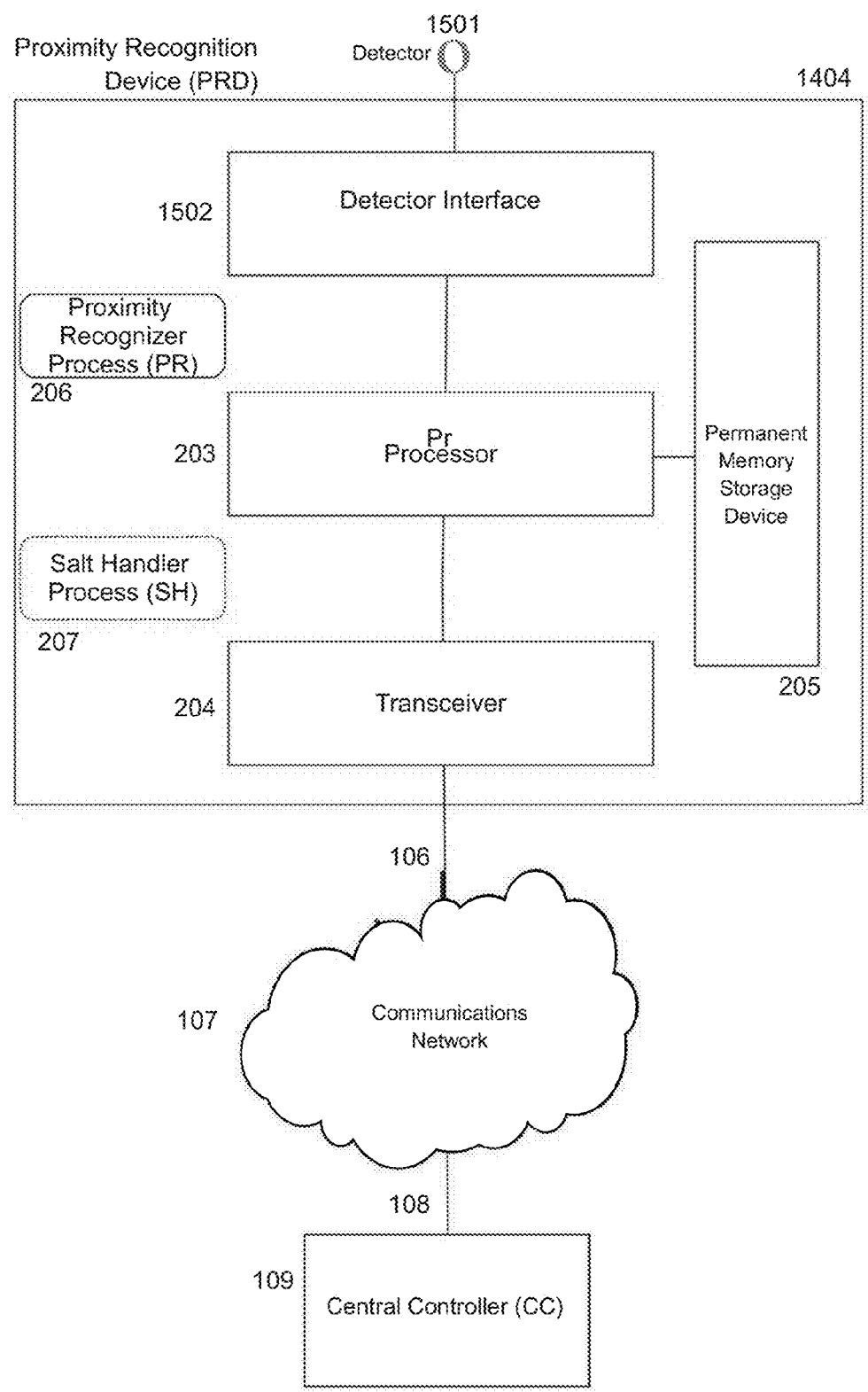
FIG. 15 is a functional block diagram of a proximity recognition device according to a further embodiment.

FIGS. 14 and 15 are more generalized embodiments of the invention shown in, and explained in conjunction with, FIGS. 1 and 2. PRDs 1404 and 1405 (of FIGS. 14 and 15) are generalized versions of PRDs 104 and 105 (of FIGS. 1 and 2).

FIG. 14 replaces Wi-Fi enabled devices 101, 102, 103 (carried by visitors) of FIG. 1 with, respectively, Visitor and (his/her) Personal Information 1401, 1402, 1403. Visitor Personal Information 1401, 1402, 1403 includes the visitor's personal, identity information that is (at least) very particular to and intimately associated with, and/or (ideally) unique to the visitor and his/her environment.

An example of Visitor Personal Information 1401, 1402 or 1403 include the MAC address of the Wi-Fi enabled mobile device 101, 102 carried by the visitor (as described earlier in conjunction with FIGS. 1-13).

Another example of Visitor Personal Information 1401, 1402 or 1403 is information that is physically personal to the visitor. For example, FIG. 15 shows PRD 1404 where antenna 201 and wireless transceiver 202 of PRD 104 of FIG. 2, are respectively replaced by (more general) Visitor Detector 1501 and Visitor Detector Interface 1502 of PRD 1404 (that may be, respectively, a camera and image processing technology). Visitor Detector 1501 and Visitor Detector Interface 1502 of PRD 1404 can be for active or passive recognition of visitors.

The visitor's facial features are detected by an active or passive version of Visitor Detector 1501, such as a camera, where Visitor Detector Interface 1502 carries out image signal processing and related functions, and produces the equivalent of the wireless versions described above in conjunction with FIGS. 1-13. Such visual hardware and software well-known in the art For ease of explanation herein, the data structures (e.g. PDU, augmented PDU or packets, and the like) described earlier, may be used for data from visual systems.

Although proximity detection/recognition has been described above using Wi-Fi technology, other communications-based proximity-aware devices and technologies are possible. Examples include those that perform proximity detection based on (Qualcomm's) LTE Direct, a peer-to-peer cellular technology that allows proximity detection between two peers of cellular phones or devices; Wi-Fi Direct; Bluetooth and (Over-the-top) OTT technologies. For a particular example, PRDs 1404, 1405 may be (Qualcomm's) LTE Direct-proximity detectors, and Visitor Personal Information 1401, 1402 or 1403 may be LTE Direct enabled devices with proximity recognition being performed by (LTE) Visitor Detector 1501, Visitor Detector Interface 1502 and PR process 1606 (from FIGS. 14 and 15).

Accordingly, a Mobile Device herein is any device (e.g. mobile phone, watch, tablet, glasses) that is typically carried by a visitor that is based on a communications standard that enables proximity discovery (including, of course, the aforementioned Wi-Fi devices of FIGS. 1-13).

A common meaning of "salt" is random data that is used as an additional input to a one-way function that hashes a password or passphrase (and serves to defend against certain types of hacking attacks). Thus, the term "salt" and the anonymizing process has been used above (in conjunction with FIGS. 1-13).

Hereinafter, the term "salt" (and cognate variation, such as "salting") is intended to cover such common meaning and also any randomizing process that is applied to generate a "Visitor Identifier" from Visitor Personal Information (1401, 1402, 1403) that is not attributable back to the subject visitor (thus obfuscating him or her as an identifiable individual).

The generation of a salt, and its handling, may be performed at the level of a set of PRDs (i.e. at the level of a VCG) or "upstream" thereof (i.e. SOH Salt Operations Handler, SCH Salt Configuration Handler, of FIGS. 1-13) (i.e. with necessary coordination for and/or among the PRDs), and the "salting process" itself is performed "at and by" the PRD (i.e. "at source"). The generation of the salt and distribution of the generated salt is performed to a pre-designated group of PRDs (being the VCG) at the level of PRDs and upstream thereof. The preceding is explained earlier in conjunction with FIGS. 1-13.

Another way of anonymizing is presented in conjunction with FIGS. 14-18, wherein the salt is generated by PRD 1604 by itself and solely for itself, based on its context (and no one else's) that it has detected "within" itself or proximate itself, and used by it to anonymize Visitor Personal Information (i.e. all anonymizing steps are performed "at source" of PRD 1604). In this embodiment, each PRD 1604 generates its own salt (as explained below) without any necessary knowledge, reference, link or any other relationship with any other PRD 1604 or non-PRD entity (such as SH 207, SOH SCH, etc. of FIGS. 1-13).

Such self-generated salt is combined with the MAC address of (device carried by) the visitor (or the visual equivalent thereof of the visitor detected by visual means, such as a camera) and hashed (and/or salted and/or anonymized with any conventional anonymity process) to form Visitor Identification, and then is combined with a payload (i.e. a reading such as RSS or equivalent "distance" information) and an identifier of the PRD (e.g. PRD serial number), and sent to Central Controller 109. From such payloads, inferences are made about the location and movement of the visitor (which is only identified by an (anonymized) "number" as explained above). The locations of PRDs (e.g. those of FIGS. 14-16) are known (or knowable) by Central Controller 109 and so such inferences can be performed conventionally so that maps showing the paths of visitors can be easily made.

Figure 16:
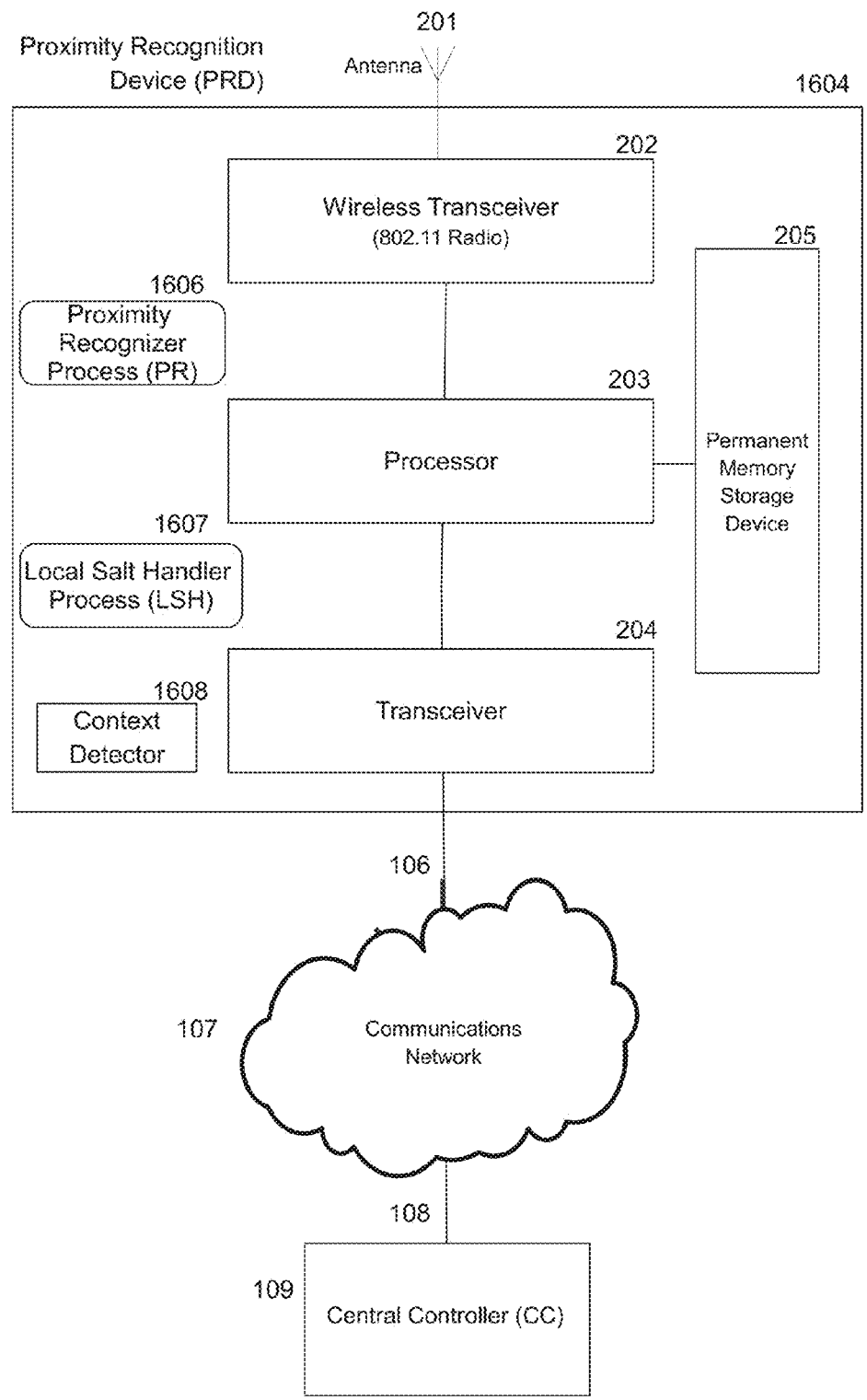
FIG. 16 is a functional block diagram of a proximity recognition device according to a further embodiment.
Figure 17:
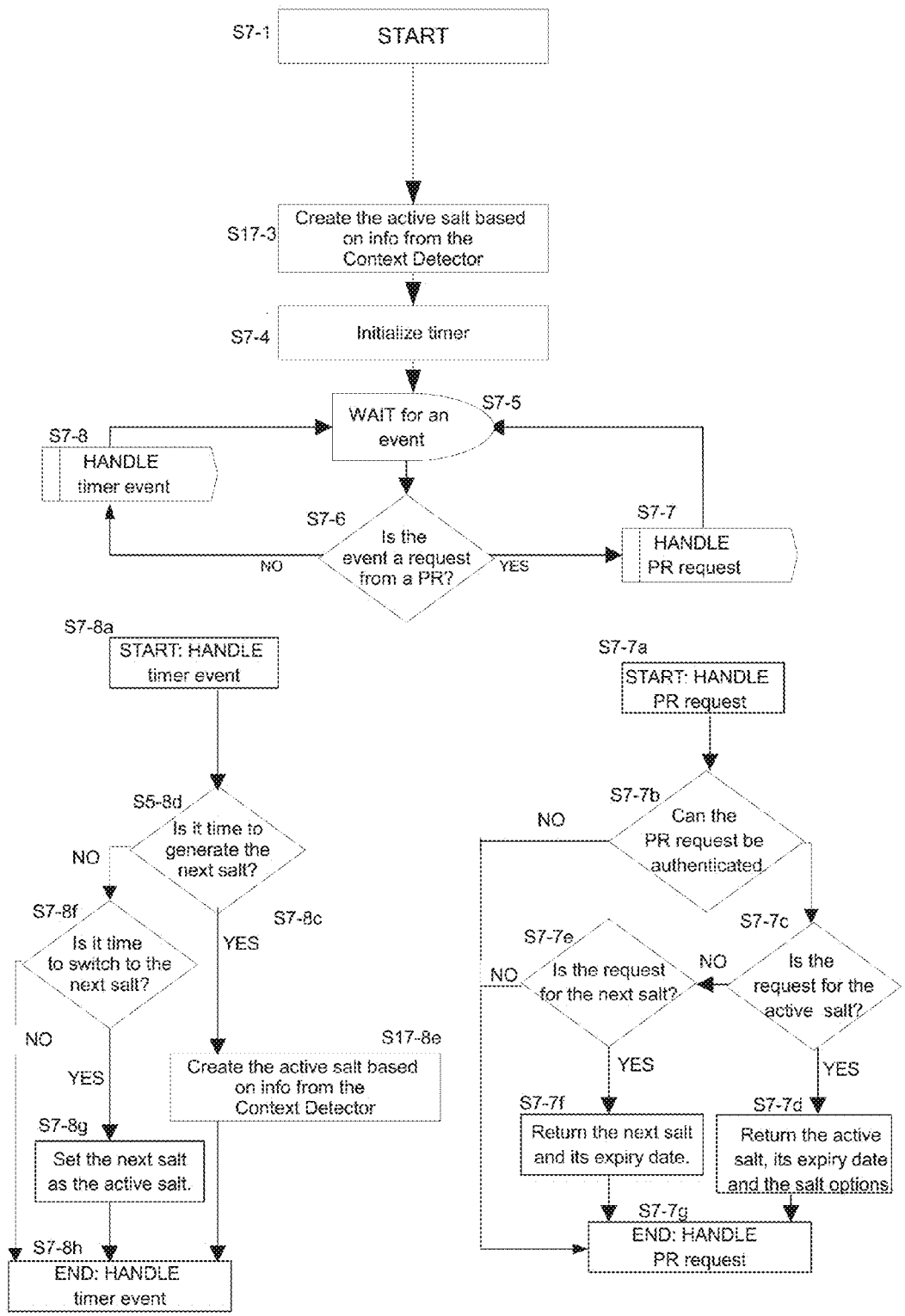
FIG. 17 is a flowchart related to FIG. 16.
Figure 18:
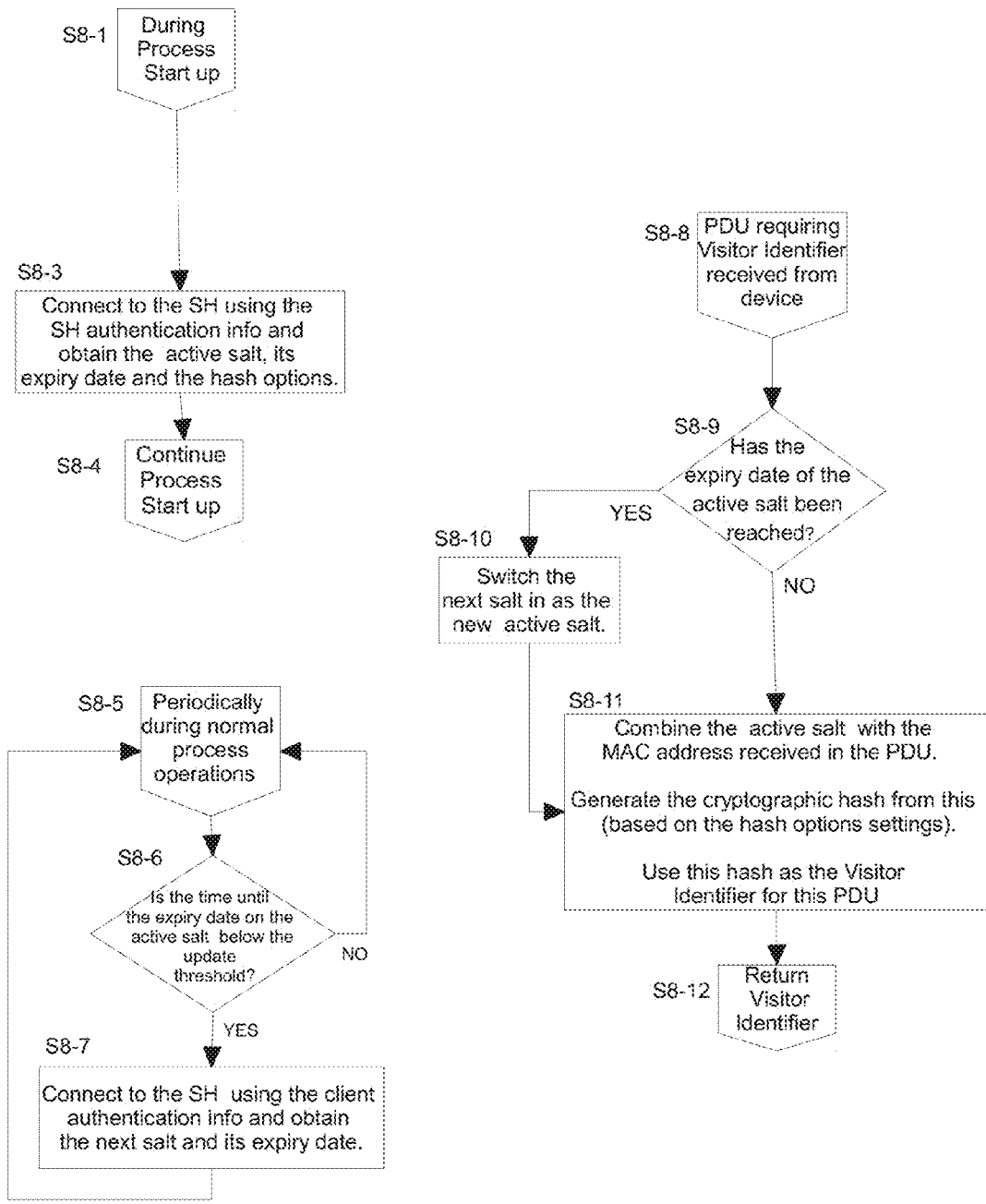
FIG. 18 is a flowchart related to FIG. 16.

FIG. 16 shows another embodiment of a PRD and another method of anonymizing. PRD 1604 has Proximity Recognizer process 1606 which (unlike its counterparts in FIGS. 1-13) simply concerns itself with proximity recognition of visitors (whether for a wireless recognition implementation, as shown in FIG. 16, or with a generalized detector/detector interface (as described above in conjunction with FIG. 15). PRD 1604 has Local Salt Handler process 1607 (LSH), which (unlike the Salt Handler SH of FIGS. 1-13), generates a salt by itself (i.e. without VCG, SOH, SCH), for its own use. This self-generated salt of PRD 1604 is done with information of contextual conditions of PRD 1604, as detected by Context Detector 1608, explained next.

Context Detector 1608 may detect conditions "at" PRD 1604 (e.g. metadata of the hardware board which PRD 1604 is implemented, such as its factory serial number or certain metrics of performance of such hardware/software). Context Detector 1608 may detect conditions "proximate" PRD 1604, whether (communications-wise) upstream and downstream information, or physical environmental conditions or other proximate context conditions (further explained below).

If two or more PRDs 1604 detect the same context, the (from upstream) inference is that they are very "proximate" to each other and in effect form a "VCG" (even though each PRD is unaware of any other PRD). Such inferred VCG can be used by central controller 109 advantageously in such situations. But with or without such situations, a VCG (i.e. some prior or inferred organization of PRDs) is not necessary for a system comprising PRDs 1604.

FIG. 16 replaces the combination of Proximity Recognizer Process (PR) 206 and Salt Handler Process (SH) 207 of FIG. 2 et seq, with a different approach with the combination of Proximity Recognizer (PR) Process 1606 and Local Salt Handler 1607 and Context Detector 1608, further described below.

In contrast with the earlier embodiment (in conjunction with FIGS. 1-13, where one PRD (or a non-PRD entity such as SOH Salt Operations Handler, SCH Salt Configuration Handler, and SH Salt Handler generates a salt for distribution to all PRDs of a VCG), this embodiment discloses that a (and, in the result, each) PRD 1604 generates and uses its salt (with or without knowledge of other PRDs) and accordingly, Local Salt Handler 1507 is rendered in FIG. 16, in solid lines (versus dotted lines) to signify its permanently active status in each PRD 1604.

A significant addition in the embodiment of FIG. 16 (relative to the earlier embodiments) is Context Detector 1608, which is always active in every PRD 1604. Context Detector 1608 detects information/conditions which are "at" or "proximate" PRD 1604. Such conditions may be communications information upstream and/or downstream of PRD 1604; or transient or non-transient; may be internal to PRD 1604 or external environmental conditions. These will be explained more below.

Note the following "landscape" categories of contextual conditions.

A. The contextual condition includes proximate conditions that are transient over a suitable period of time. Examples include: parameters or behavior of the communication network involving PRD 1604 and any nearby PRDs (of any embodiment); the transient electrical signature of the electrical mains supplying all PRDs and machinery and electrical infrastructure of a venue measured over a prescribed period of time; the signature of the lighting or any other portion of the electromagnetic spectrum measured over a prescribed period of time ("what color is the sky?" seen by the PRD); the average snowfall (or rainfall or barometric pressure) readings over a prescribed period of time at a nearby mountain or geographic feature, as publicly reported and available. It could include the facial features of the subject visitor or all nearby visitors, in some embodiments.

B. The contextual condition includes proximate conditions that are not transient (over a long period of time). Examples include the "meta-data" of the hardware that PRD 1604 is programmed to run on (e.g. circuit board manufacturer code and first ten digits of board serial, or a PRD serial number assigned by the system operator, such as store or mall operator); the physical location of a PRD within a prescribed geo-fence in the venue (e.g. a physical, GPS-derived perimeter, which may correspond, for example, to a single store or common area in a mall, or to scaled (larger and smaller) versions thereof in a mall or other venues).

C. The contextual condition (transient or non-transient) includes proximate conditions that are upstream communications-wise of PRD 1604. For example, Context Detector 1608 may interact with Transceiver 204 and other upstream entities and processes to obtain upstream contextual factor(s) such as IP address of an upstream router or name server used by the venue for PRD 1604, such as locations in IP space (depending on the communications protocol). a prescribed IP address (e.g. of a DNS name server) that PRD 1404 communicates with. Similarly, contextual condition include proximate conditions that are downstream from PRD 1404. Context Detector 1608 interacts with Visitor Detector 1501, Visitor Detector Interface 1502 and Proximity Recognizer 1606, to obtain downstream Contextual Factor(s) such as a visitor's facial features.

It will be appreciated that the above "transient" and "non-transient" characterization is, in reality, not, binary and may be, in implementation, a matter of degree. A certain amount of adjustment will be called for, for the operator to get optimal performance for its objectives. Whether one asks for reading two weeks of weather reports or three, and whether the former is called "transient" and the later, "non-transient", is not important. The operator simply adjusting to fit the context of its venue and PRDs 1604 (e.g. rainy season, desert coastal area, etc.). The important teaching of this embodiment is that context is detected and considered for advantageous use in anonymizing Visitor Personal Information.

To the extent that two or more PRDs share a common contextual condition value (e.g. a common environmental (physical, electrical, meterological, etc.) signature, then a "VCG" (as proposed by the embodiments explained earlier in conjunction with FIGS. 1-13)) can be an "emergent property" of the system (even though PRD 9604 itself doesn't know of or care about anyone but itself), and accordingly, some useful inferences can be made upstream of each PRD 1604. But no concept of a predefined collection of PRDs in a VCG, is necessary for the use of "context based" salt generation, let alone required by FIG. 16. Thus it is possible to reprogram/simplify FIGS. 7 and 8 as FIGS. 17 and 18, but it is not necessary. The anonymizing process for PRD 1604 can simply be two steps. The first is that Context Detector 1608 detects one or more "contextual conditions" (as described above), and informs Local Salt Handler (or simply, Anonymizer) 1607. The second step is that, based on such informed context conditions, LSH or Anonymizer 1607, timely generates a salt (with prescribable expiry date) with conventional random number generator algorithms, using such detected and informed contextual conditions as part of forming a seed for such algorithms. After PR 1606 (which recognizes incoming Wi-Fi PDUs or visual equivalents, and does nothing else except proximity recognition of visitors), the (thus detected context parameterized and generated) salt is used to generate Visitor Identification. LSH 1607 (and PRD 1404 generally), otherwise performs as PRD 104 (except for the salt-generation and handling aspects). The "timely generation" of a salt can be Implemented by a loop process that keeps in mind the expiry date of the (last generated) salt and wig generate a new salt (again based on contextual Conditions) In time for the switch over as a salt expires.

Obviously, a salt derived from the "transient" contextual conditions/signatures, are likely more "random" than non-transient ones. But the desired degree of randomness ("pure", "pseudo-random", etc.), or almost equivalently, the degree of resistance to hacking, is a matter of adjustment of "transience" to fit objectives for the venue, how long any particular "history" of information is kept, etc.

It is possible (and in some commercial settings and organizations, desirable) to cover the entire venue with a hybrid system that has a plurality of PRDs 1604 (in conjunction with FIG. 14) and of PRDs 404 (in conjunction with FIG. 13 et seq), whether VCGs are used or not. For example, in a mall, some areas may be covered by one embodiment (e.g. within a single store, or for each store in a mall) while other areas may be covered by another embodiment (e.g. mall parking lot). If for some areas where a VCG is desired, than the use of a non-transient contextual condition can be easily arranged (e.g. the same metadata of the hardware for the PRDs or the same context of belonging to a particular store or store chain). In other areas, no VCG is needed or wanted. Similarly, whether the operator operates several malls, or a chain of stores distributed over several locations, a hybrid super-system of different embodiments and adjustments, will advantageously suggest itself.

The result (of the various embodiments described above) is a Proximity Event where its Visitor Identifier cannot be attributable to a particular visitor because anonymization has been performed "at source" (i.e. at the PRD) or "very proximate source", and in one embodiment, both the generation of a salt and use of it (without more) is performed "at source" (by itself without coordination or other relationship to any other PRD or any upstream entity).

Accordingly, while this invention has been described with reference to the illustrative embodiments, this description is not intended to be construed in any limiting sense. Various modifications of the illustrative embodiments, as well as other embodiments of the invention, will be apparent to persons skilled in the art upon reference to this description.

The invention claimed is:

1. A method for tracking a visitor to a venue, comprising the steps of:
   (a) providing a Proximity Recognition System (PRS) of a plurality of Proximity Recognition Devices (PRDs);
   (b) defining two sub-groups among said plurality of PRDs, and assigning each PRD of said plurality of PRDs, to one and only one said sub-group of said two sub-groups for membership thereof;
   (c) for each sub-group of said two sub-groups of PRDs, defining additional local information derived from its immediate environment that is derivable only by a PRD assigned to the respective sub-group, wherein the additional local information is unique to its respective sub-group and is otherwise unknown and undiscoverable, by any entity outside of the respective sub-group;
   (d) determining, by said PRS, a unique identifier of the visitor upon detection and recognition by one of said plurality of PRDs assigned to one of said two sub-groups;
   (e) anonymizing, by the sub-group which detected and recognized the visitor, said unique identifier of the visitor by combining said unique identifier of the visitor with said additional local information defined for its respective sub-group that detected and recognized the visitor.

2. The method of claim 1, wherein said visitor unique identifier is derived from visitor's WLAN-enabled device's MAC address and said sub-group first local/additional information is random data generated by said sub-group.

3. The method of claim 1, wherein said anonymized visitor unique identifier is further complicated/anonymized by applying a one-way function thereto.

4. The method of claim 2, wherein first additional information is a salt.

5. The method of claim 1 wherein said PRD/PRS includes functionality for determining a unique feature of the visitor's face and said visitor unique identifier is visitor's facial feature.

6. The method of claim 1 wherein said PRD/PRS includes functionality for detecting a visitor's LTE-enabled mobile phone, and said visitor unique identifier is derived from visitor's LTE-based mobile phone.

7. The method of claim 6, further comprising the step of: sending upstream the (time and physical location) data details of the visit of said detected visitor by said anonymized visitor unique identifier.

8. The method of claim 7, wherein the defining of local/additional information in step 1(c) is performed by a single PRD which generates and maintains a salt, and disseminates to other PRDs of its sub-group.

9. The method of claim 8, wherein said single PRD is selected by all the PRDs of a sub-group by a method whose result is known only by said PRDs of a sub-group.

10. The method of claim 8, wherein each PRD is adapted to generate a random number, and the PRD which has the highest random number, is selected to be said single PRD.

11. The method of claim 1, further providing the PRS with a central controller.

12. The method of claim 4, wherein said salt is generated by said central controller and sent exclusively to one said sub-group to use.

13. The method of claim 4, wherein within said one sub-group, said salt is generated by one sub-group and is kept exclusively within the control and knowledge of said one group.

14. The method of claim 4, wherein within said one sub-group, one PRD is tasked with generating/configuring the salt.

15. The method of claim 14, wherein the step of tasking said one PRD to generate the salt, is a process that is kept exclusively within said one sub-group.

16. The method of claim 14, wherein said one salt-generating PRD is configured to notify the other PRDs in said one sub-group of said salt it generated.

17. The method of claim 14, wherein said salt is configured by said salt-generating PRD, to have a time limit, after which it ceases to be active and used by any PRD in said sub-group, and said step (c) of claim 1, is then performed again as the time limit of the then active salt is expiring.

18. The method of claim 7, further comprising the step of analyzing said visitor data with earlier received data to determine the venue traffic statistics.

* * * * *